US012566965B2

(12) United States Patent
Millius et al.

(10) Patent No.: US 12,566,965 B2
(45) Date of Patent: Mar. 3, 2026

(54) TRAINING AND/OR UTILIZING AN INTERACTION PREDICTION MODEL TO DETERMINE WHEN TO INTERACT, AND/OR PROMPT FOR INTERACTION, WITH AN APPLICATION ON THE BASIS OF AN ELECTRONIC COMMUNICATION

(71) Applicant: GOOGLE LLC, Mountain View, CA (US)

(72) Inventors: Sebastian Millius, Zurich (CH); Tom Hume, San Francisco, CA (US); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/426,036

(22) Filed: Jan. 29, 2024

(65) Prior Publication Data

US 2024/0169206 A1 May 23, 2024

Related U.S. Application Data

(63) Continuation of application No. 17/466,843, filed on Sep. 3, 2021, now Pat. No. 11,887,006, which is a
(Continued)

(51) Int. Cl.
*G06N 3/08* (2023.01)
*G06F 40/216* (2020.01)
(Continued)

(52) U.S. Cl.
CPC .......... *G06N 3/084* (2013.01); *G06F 40/216* (2020.01); *G06F 40/284* (2020.01); *G06F 40/30* (2020.01);
(Continued)

(58) Field of Classification Search
CPC ........ G06F 3/048; G06F 40/284; G06F 40/35; G06F 40/216; G06F 40/30; G06F 3/084;
(Continued)

(56) References Cited

U.S. PATENT DOCUMENTS 9,378,467 B1    6/2016  Chaiyochlarb et al.
9,519,408 B2   12/2016  Shoemaker et al.
(Continued)

FOREIGN PATENT DOCUMENTS

CN        103077224       5/2013
CN        105160397      12/2015
(Continued)

OTHER PUBLICATIONS

China National Intellectual Property Administration; Notification of Second Office Action issued in Application No. 201880039659.4, 40 pages, dated Oct. 16, 2023.
(Continued)

*Primary Examiner* — Mahelet Shiberou
(74) *Attorney, Agent, or Firm* — Gray Ice Higdon

(57) ABSTRACT

Training and/or utilizing an interaction prediction model to generate a predicted interaction value that indicates a likelihood of interaction with a corresponding application on the basis of an electronic communication. The application can be in addition to any electronic communication application that is utilized in formulating the electronic communication and/or that is utilized in rendering the electronic communication. The predicted interaction value can be generated based on processing, utilizing the interaction prediction model, of features of the electronic communication and/or of other features. The predicted interaction value can be utilized to determine whether to perform further action(s) that interact with, and/or enable efficient interaction with, the application on the basis of the electronic communication.

20 Claims, 13 Drawing Sheets

Related U.S. Application Data continuation of application No. 15/815,478, filed on Nov. 16, 2017, now Pat. No. 11,113,604.

(60) Provisional application No. 62/582,176, filed on Nov. 6, 2017.

(51) Int. Cl.

| | |
|---|---|
| *G06F 40/284* | (2020.01) |
| *G06F 40/30* | (2020.01) |
| *G06F 40/35* | (2020.01) |
| *G06N 3/044* | (2023.01) |
| *G06N 3/045* | (2023.01) |
| *G06N 3/084* | (2023.01) |
| *G06Q 10/107* | (2023.01) |
| *H04L 51/046* | (2022.01) |
| *H04L 51/234* | (2022.01) |
| *H04M 1/72403* | (2021.01) |
| *H04M 1/72484* | (2021.01) |
| *G06F 40/169* | (2020.01) |
| *H04M 1/72436* | (2021.01) |
| *H04M 1/72451* | (2021.01) |
| *H04M 1/72454* | (2021.01) |

(52) U.S. Cl.

CPC ............. *G06F 40/35* (2020.01); *G06N 3/044* (2023.01); *G06N 3/045* (2023.01); *G06Q 10/107* (2013.01); *H04L 51/046* (2013.01); *H04L 51/234* (2022.05); *H04M 1/72403* (2021.01); *H04M 1/72484* (2021.01); *G06F 40/169* (2020.01); *H04M 1/72436* (2021.01); *H04M 1/72451* (2021.01); *H04M 1/72454* (2021.01)

(58) Field of Classification Search

CPC .... G06F 3/0445; G06N 3/084; G06N 3/0445; G06Q 10/107; H04L 51/045; H04L 51/34; H04M 1/72522; H04M 1/72597; H04M 1/722552; H04M 1/72566; H04M 1/72569

See application file for complete search history.

(56) References Cited

U.S. PATENT DOCUMENTS

| | | | | |
|---|---|---|---|---|
| 10,467,029 | B1 | 11/2019 | Lin et al. | |
| 10,839,325 | B2 | 11/2020 | Fowler | |
| 11,037,195 | B1* | 6/2021 | Puri | G06Q 30/0255 |
| 11,113,604 | B2 | 9/2021 | Millius et al. | |
| 2009/0319456 | A1 | 12/2009 | Consul et al. | |
| 2010/0004922 | A1 | 1/2010 | Bradley et al. | |
| 2013/0159220 | A1* | 6/2013 | Winn | G06F 16/337 |
| | | | | 706/12 |
| 2013/0159408 | A1* | 6/2013 | Winn | G06N 20/00 |
| | | | | 709/204 |
| 2013/0311411 | A1 | 11/2013 | Senanayake et al. | |
| 2015/0032366 | A1 | 1/2015 | Man et al. | |
| 2015/0185995 | A1* | 7/2015 | Shoemaker | H04M 1/72448 |
| | | | | 715/708 |
| 2015/0347534 | A1 | 12/2015 | Gross et al. | |
| 2016/0055246 | A1 | 2/2016 | Marcin et al. | |
| 2016/0321052 | A1 | 11/2016 | Sharifi et al. | |
| 2016/0352656 | A1 | 12/2016 | Galley et al. | |
| 2017/0180294 | A1 | 6/2017 | Milligan et al. | |
| 2017/0323636 | A1 | 11/2017 | Xiao et al. | |
| 2019/0050392 | A1* | 2/2019 | Clements | G06F 3/04886 |
| 2019/0129615 | A1 | 5/2019 | Sundar et al. | |
| 2021/0081227 | A1* | 3/2021 | Verma | G06N 5/01 |
| 2021/0397969 | A1 | 12/2021 | Millius et al. | |
| 2021/0399769 | A1 | 12/2021 | Millius et al. | |

FOREIGN PATENT DOCUMENTS

| | | |
|---|---|---|
| CN | 105320425 | 2/2016 |
| CN | 106095242 | 11/2016 |
| EP | 3106973 | 12/2016 |
| WO | 2017137721 | 8/2017 |

OTHER PUBLICATIONS

China National Intellectual Property Administration; Notification of First Office Action issued in Application No. 201880039659.4, 46 pages, dated Mar. 22, 2023.

European Patent Office; Preliminary Opinion issued in Application No. 18807802.6, 4 pages, dated Mar. 13, 2022.

European Patent Office; Summons to attend oral proceedings pursuant to Rule 115(1) issued in Application No. 18807802.6; 11 pages; dated Aug. 12, 2021.

Intellectual Property India; Office Action issue in Application No. 201927051104; 7 pages; dated Apr. 27, 2021.

European Patent Office; Communication pursuant to Article 94(3) EPC issued in Application No. 18807802.6;, 4 pages dated Jul. 9, 2020.

European Patent Office; International Search Report and Written Opinion of PCT Ser. No. PCT/US2018/059267; 18 pages, Dec. 21, 2018.

Ingraham, N., "Gmail now lets you add calendar events straight from your email;" https://www.theverge.com/2013/5/2/4294858/gmail-now-lets-you-add-calendar-events-straight-from-your-email; retrieved from internet: URL: https://web.archive.org/web/20130504010452; 3 pages, May 2, 2013.

Gonzalez, N.; Automatically Create Calendar Events from Incoming Text Messages on Android; 20 Pages; dated Jan. 14, 2015.

Guinness, R., "Beyond Where to How: A Machine Learning Approach for Sensing Mobility Contexts Using Smartphone Sensors;" Sensors, vol. 15, No. 5; pp. 9962-9985; XP055534129, DOI: 10.3390/s150509962 Feb. 26, 2015.

Intellectual Property India; Hearing Notice issue in Application No. 201927051104; 3 pages; dated Jun. 24, 2024.

* cited by examiner

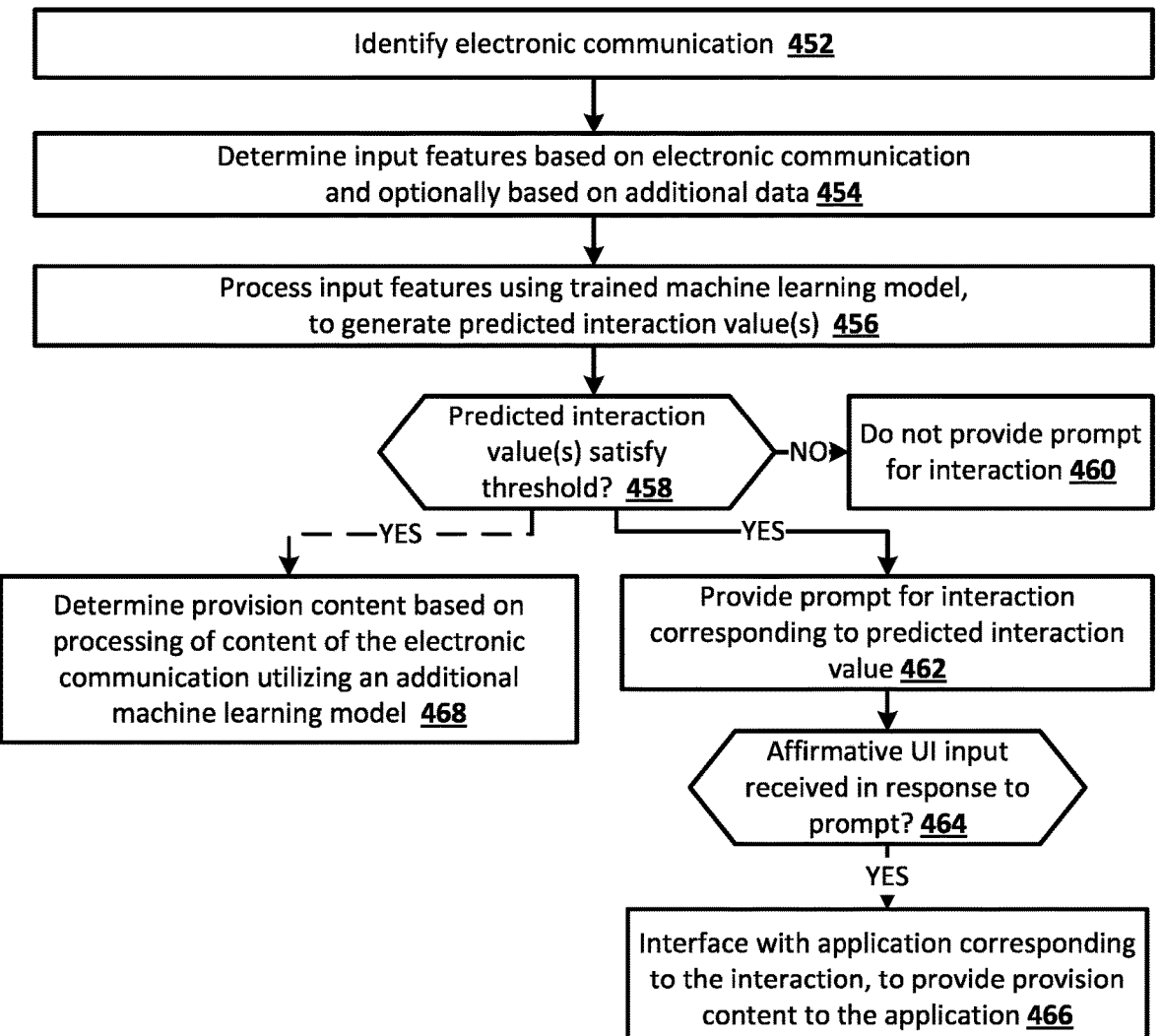

Identify electronic communication 452

Determine input features based on electronic communication
and optionally based on additional data 454

Process input features using trained machine learning model,
to generate predicted interaction value(s) 456

Predicted interaction
value(s) satisfy
threshold? 458

Do not provide prompt
for interaction 460

Determine provision content based on
processing of content of the electronic
communication utilizing an additional
machine learning model 468

Provide prompt for interaction
corresponding to predicted interaction
value 462

Affirmative UI input
received in response to
prompt? 464

YES

Interface with application corresponding
to the interaction, to provide provision
content to the application 466

FIG. 4

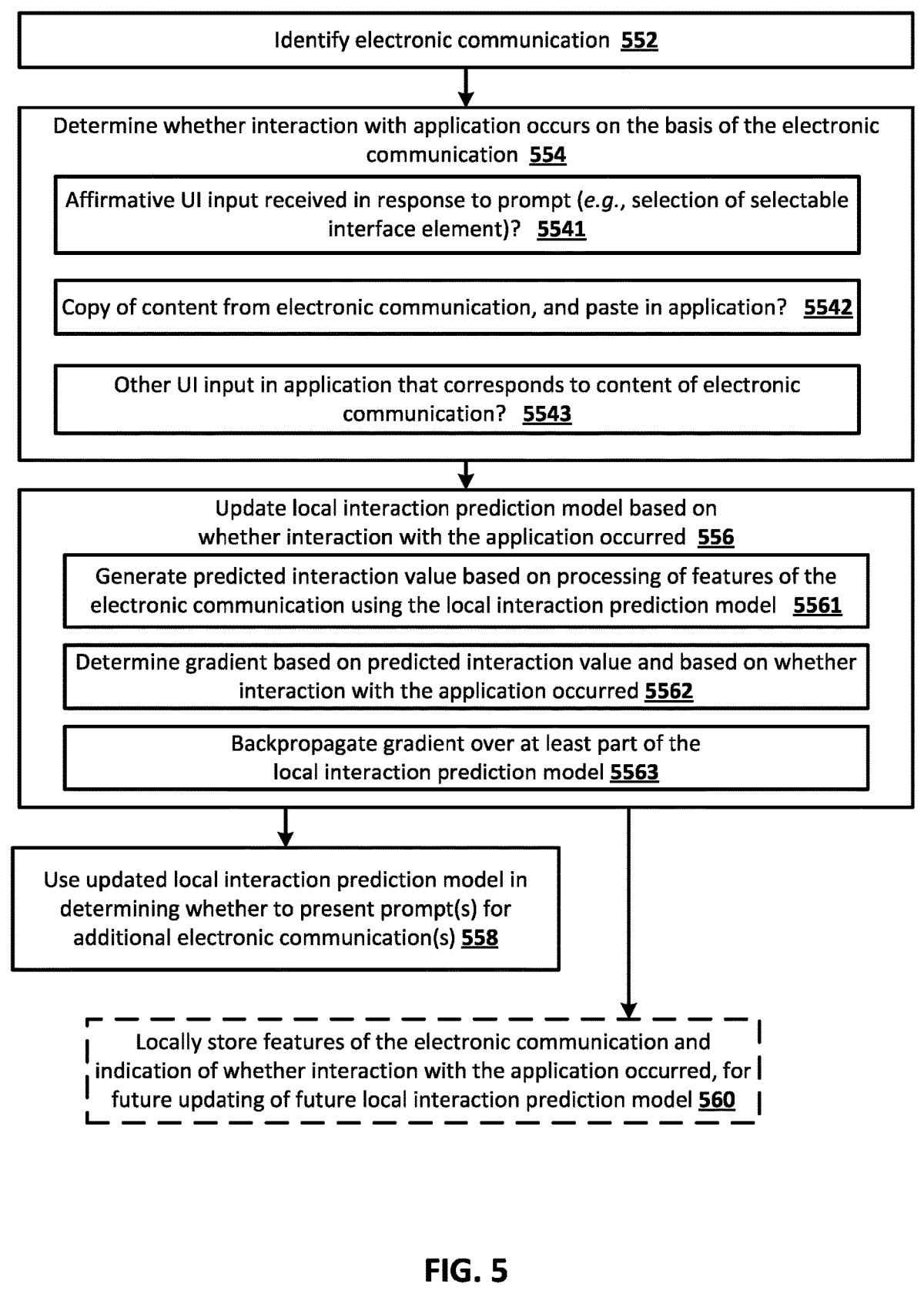

Identify electronic communication 552

Determine whether interaction with application occurs on the basis of the electronic communication 554

Affirmative UI input received in response to prompt (*e.g.*, selection of selectable interface element)? 5541

Copy of content from electronic communication, and paste in application? 5542

Other UI input in application that corresponds to content of electronic communication? 5543

Update local interaction prediction model based on whether interaction with the application occurred 556

Generate predicted interaction value based on processing of features of the electronic communication using the local interaction prediction model 5561

Determine gradient based on predicted interaction value and based on whether interaction with the application occurred 5562

Backpropagate gradient over at least part of the local interaction prediction model 5563

Use updated local interaction prediction model in determining whether to present prompt(s) for additional electronic communication(s) 558

Locally store features of the electronic communication and indication of whether interaction with the application occurred, for future updating of future local interaction prediction model 560

FIG. 5

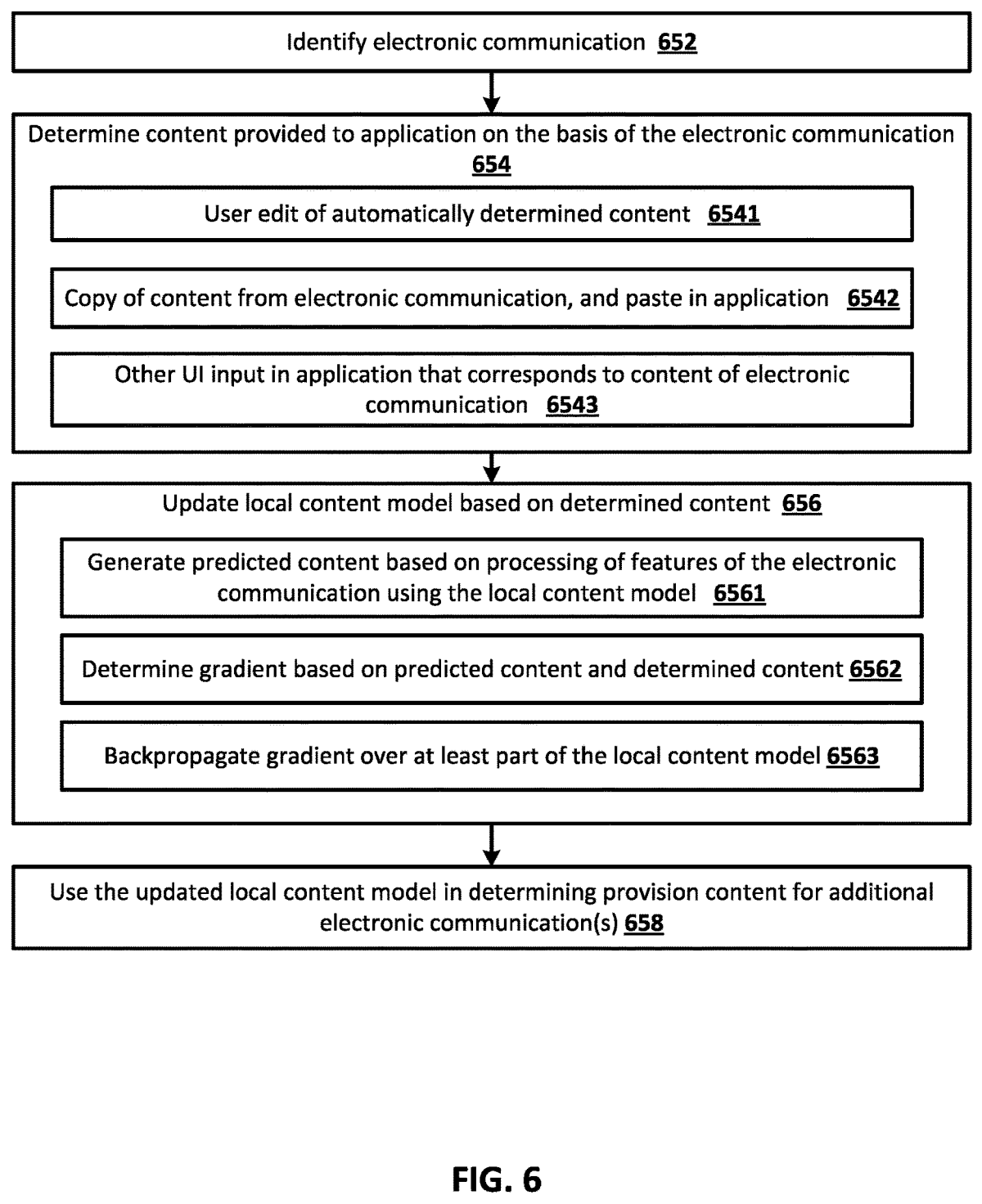

Identify electronic communication 652

Determine content provided to application on the basis of the electronic communication 654

User edit of automatically determined content 6541

Copy of content from electronic communication, and paste in application 6542

Other UI input in application that corresponds to content of electronic communication 6543

Update local content model based on determined content 656

Generate predicted content based on processing of features of the electronic communication using the local content model 6561

Determine gradient based on predicted content and determined content 6562

Backpropagate gradient over at least part of the local content model 6563

Use the updated local content model in determining provision content for additional electronic communication(s) 658

FIG. 6

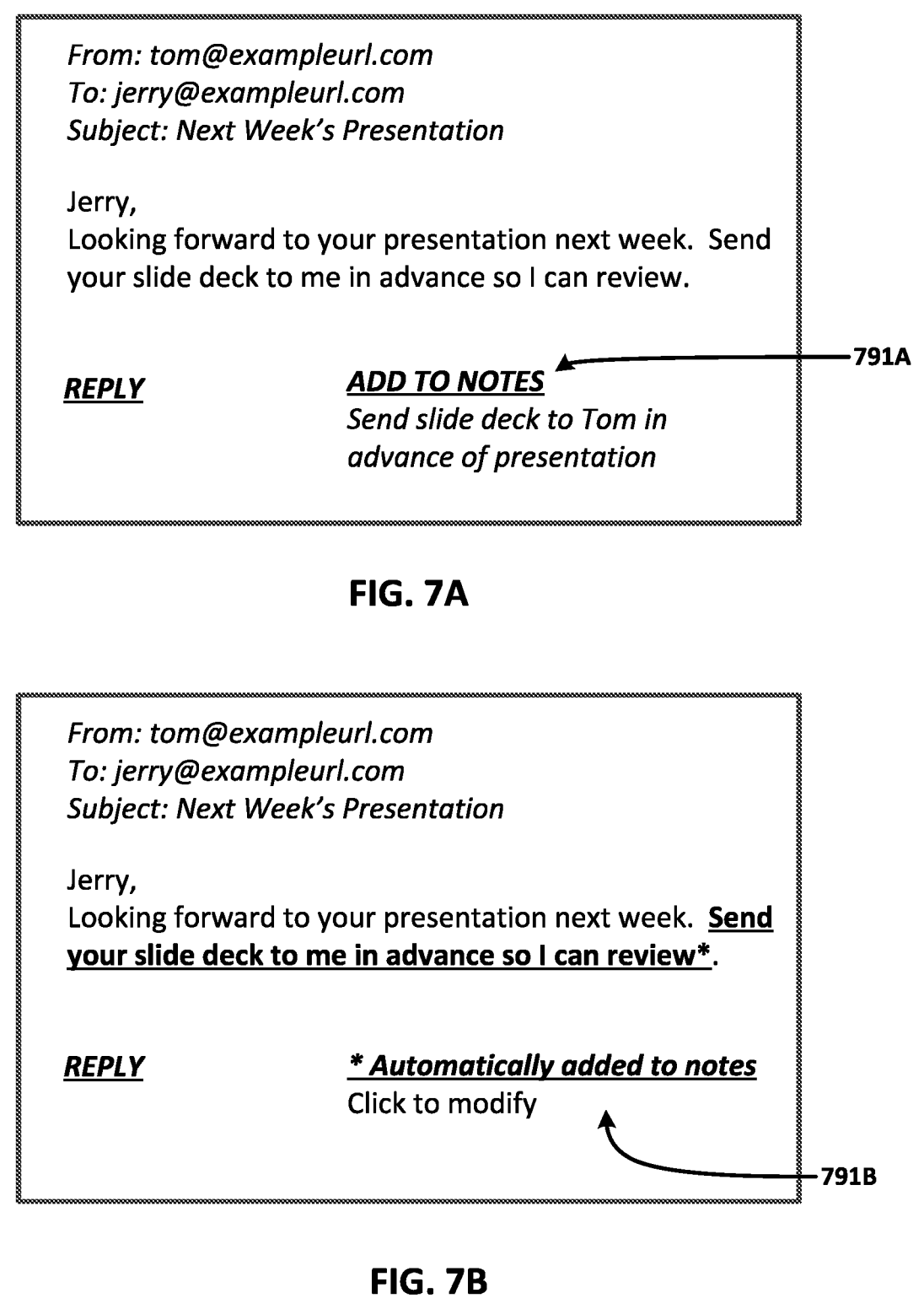

*From: tom@exampleurl.com*
*To: jerry@exampleurl.com*
*Subject: Next Week's Presentation*

Jerry,
Looking forward to your presentation next week. Send
your slide deck to me in advance so I can review.

_REPLY_        _ADD TO NOTES_              —791A
                    *Send slide deck to Tom in*
                    *advance of presentation*

FIG. 7A

*From: tom@exampleurl.com*
*To: jerry@exampleurl.com*
*Subject: Next Week's Presentation*

Jerry,
Looking forward to your presentation next week. Send
your slide deck to me in advance so I can review\*.

_REPLY_        **_\* Automatically added to notes_**
                    Click to modify
                               —791B

FIG. 7B

TRAINING AND/OR UTILIZING AN INTERACTION PREDICTION MODEL TO DETERMINE WHEN TO INTERACT, AND/OR PROMPT FOR INTERACTION, WITH AN APPLICATION ON THE BASIS OF AN ELECTRONIC COMMUNICATION

BACKGROUND

Users are often inundated with electronic communications such as emails, chat communications, SMS communications, voicemails, and social networking communications. For some electronic communications, when a user is viewing and/or listening to the communication via a corresponding application of a client device, the user may desire to interact with another application of the client device in response to the communication. For example, for a received text message of "don't forget to pick up some avocados", a user may desire to interact with a reminder application to set a reminder for "picking up avocados" and/or desire to interact with a note-taking application to add "avocados" to a to-do list, a grocery list, and/or other list.

Some techniques have been proposed for automatically detecting certain types of content in electronic communications and, in response, providing a link or other element for presentation that, when selected, opens another application. For example, some techniques can recognize the occurrence of a term that corresponds to a day of the week (e.g., "Today", "Tuesday", "Friday"), and, in response, can provide a hyperlink that, when selected, opens a calendar application.

However, these and other techniques have various drawbacks. For example, some techniques trigger further functionality for an electronic communication only if the electronic communication conforms to certain non-robust rules defined for the further functionality. For instance, the further functionality can be triggered only in response to occurrence of certain predefined and inflexible conditions, such as the occurrence of certain terms and/or the occurrence of certain term(s) in a certain positional order. Accordingly, the further functionality may not be triggered in response to various electronic communications for which it is pertinent, as a result of those various electronic communications not strictly conforming to the predefined inflexible conditions. This can result in a user instead needing to utilize more inputs and more computational resources to cause the further functionality to occur. Moreover, some techniques trigger the further functionality in response to various electronic communications for which it is not pertinent, solely because those various electronic communications happen to conform to the predefined inflexible conditions. This can result in unnecessary rendering of elements to perform the further functionality. As another example, some techniques may not be tailored to individual users and/or devices, leading to lack of triggering for certain communications for which triggering is desirable and/or to triggering for certain other communications for which triggering is not desirable. This can also result in computational inefficiencies, such as those noted above.

SUMMARY

Implementations of this specification are directed to training and/or utilizing an interaction prediction model to generate at least one predicted interaction value that indicates a likelihood of interaction with at least one corresponding application on the basis of an electronic communication (e.g., email, chat communication, SMS communication, voicemail (e.g., transcribed voicemail), social networking communication, transcribed verbal conversation). The application can be in addition to any electronic communication application that is utilized in formulating the electronic communication and/or that is utilized to render the electronic communication. For example, a received chat communication can be rendered using a chat application, and the predicted interaction value can indicate a likelihood of interaction with a separate application, such as a note-keeping application, a calendar application, or a Web-based document editing application. As another example, an electronic communication can be formulated utilizing a keyboard application, and the predicted interaction value can indicate a likelihood of interaction with a separate application, such as a calendar application.

The predicted interaction value can be generated based on processing, utilizing the interaction prediction model, of features of the electronic communication (e.g., tokens of the electronic communication, features of a sender and/or recipient(s) of the electronic communication), and/or of other features (e.g., contextual features that are independent of the electronic communication). The predicted interaction value can be utilized to determine whether to interact with, and/or to enable efficient interaction with, the application on the basis of the electronic communication. For example, the predicted interaction value can be utilized to determine whether to render a graphical and/or audible prompt that, when responded to with affirmative user interface input, causes interaction with the application to provide at least part of the content of the electronic communication to the application. In various implementations, features (e.g., tokens) of the electronic communication are processed utilizing a separate content model to determine part(s) of the content of the electronic communication to provide to the application. In some of those implementations, the separate content model is utilized to process a given electronic communication only in response to determining, based on the predicted interaction value, to perform further functionality that interacts with, and/or enables interaction with, the application on the basis of the electronic communication.

In some implementations, the interaction prediction model is a trained machine learning model, such as a neural network model. In some of those implementations, the trained machine learning model is tailored to a given user and/or to given client device(s) based on observations of interaction (and/or observations of lack of interaction), of the given user and/or the client device(s), with application(s) on the basis of various electronic communications. In some versions of those implementations, the trained machine learning model is tailored in view of training of the model that is based on the observations of interaction and/or observations of lack of interaction. This can improve accuracy and/or robustness of the model for the user and/or client device(s), thereby enabling action(s) that are based on output of the model to be performed when appropriate, and to be suppressed when not appropriate. The action(s) can include presenting selectable interface elements and/or other prompts that, when responded to with affirmative user interface input, cause selected content of a corresponding electronic communication to be provided to the application. The action(s) can additionally include determining the selected content to be provided to the application, optionally utilizing one or more separate machine learning models. Further, in some of the versions where the machine learning model is tailored, the model is stored locally at the client device(s), and the training to tailor the model is performed by the client device(s). This can enable training of the model based on potentially sensitive data, while maintaining security of the potentially sensitive data. In some of those and/or other versions, the training of the model by the client device includes training portion(s) of the model, while maintaining other portion(s) of the model as fixed. This can be computationally efficient, can lead to quicker adaptation of the model to the user and/or client device(s), and/or can maintain trained parameters of the other portion(s) of the model. Additional description of these and other implementations is provided below, along with various additional and alternative technical advantages that can be achieved according to various implementations.

In some implementations, a generated predicted interaction value can be utilized to determine whether to present a prompt that, when responded to with affirmative user interface input, causes interaction with the application to provide at least part of the content of the electronic communication to the application. As one particular example, the electronic communication can be a chat message that includes "don't forget to pick up some avocados". Content of (e.g., tokens of) the chat message and/or contextual features can be processed, using the interaction prediction model, to generate a predicted interaction value that indicates a likelihood of interaction with a note-keeping application on the basis of the chat message. Based on the predicted interaction value satisfying a threshold, a prompt can be audibly and/or graphically rendered that suggests incorporation of at least part of the chat message into the note-keeping application. For instance, the prompt can be a selectable graphical interface element that includes "Add avocados to your shopping list". In response to affirmative input being received in response to the prompt (e.g., a single "tap" of the selectable graphical interface element), interaction with the note-keeping application can occur to automatically populate at least part of the content (e.g., "avocados") in the note-keeping application. For instance, the interaction can occur via an application programming interface (API) of the note-keeping application to automatically incorporate "avocados" in a "shopping list" maintained by the note-keeping application. Also, for instance, the interaction can occur via the API and cause the note-keeping application to be executed and/or surfaced, and to cause the note-keeping application to: present an interface with "avocados" suggested for incorporation in the shopping list, and present a further interface element that can be selected to incorporate "avocados" in the shopping list. In various implementations, the prompt enables provision of content to a corresponding application in a more computationally efficient manner relative to other techniques, such as techniques that require a user to utilize a multitude of user interface inputs to select the text, copy it to a clipboard, open the application, then paste the copied text into the application. For example, a single response to the prompt (e.g., a spoken "yes" in response to an audible prompt, a single tap of a graphical interface element) that causes the provision of content to an application can be more computationally efficient at least as a result of reducing the number of inputs required to provide the content. Moreover, such single-responses can be advantageous to a user with reduced dexterity, for which reducing the number of required inputs may benefit the user.

In some additional and/or alternative implementations, the predicted interaction value can be utilized to automatically interact with an application to automatically provide at least part of the content of the electronic communication to the application, without first providing a selectable interface element or otherwise prompting a user. For example, interaction with a note-keeping application can automatically occur (e.g., via an API) to provide at least part of the content to the note-keeping application, without first prompting the user. This can be computationally efficient, as it eliminates the need for user input to provide the content. In some of those implementations, a predicted interaction value is utilized in determining whether to automatically provide at least part of the content of the electronic communication to the application, without first providing a selectable interface element or otherwise prompting a user—or to instead first prompt the user. For example, if the predicted interaction value satisfies first and second thresholds, at least part of the content can be automatically provided to the application without first prompting a user. On the other hand, if the predicted interaction value satisfies a first threshold, but fails to satisfy the second threshold, a prompt can be provided first, and the at least part of the content provided only in response to affirmative input being received in response to the prompt.

In some additional and/or alternative implementations, the predicted interaction value can be utilized to assign, to the electronic communication, an action indication that indicates: the electronic communication as actionable and/or an application with which to interface on the basis of the electronic communication and/or content of the electronic communication to provide to the application. For example, the action indication can be embedded in metadata of the electronic communication, the electronic communication and the metadata transmitted to an additional client device, and the additional client device can present prompt(s) and/or perform automatic interaction(s) based on the action indication included in the metadata. Accordingly, a first client device can embed an action indication in an electronic communication formulated at the first client device, and the action indication can cause a second client device, that receives the electronic communication, to perform certain function(s). In these and other manners, the first client device can cause the second client device to perform certain actions by embedding an action indication in an electronic communication transmitted to the second client device by the first client device.

As mentioned above, in various implementations the interaction prediction model is a machine learning model, such as a neural network model. In some of those implementations, training and/or utilization of the machine learning model according to techniques disclosed herein enables more robust and/or more accurate determination of whether to present a prompt that, when responded to with affirmative user interface input, causes interaction with an application to provide pertinent content of the electronic message to the application. The more robust determination can enable prompts to be presented in situations where predefined inflexible rules would not, thereby enabling a computationally efficient affirmative response to the prompt to initiate providing of relevant content to an application. Further, the more accurate determination can prevent prompts from being presented in situations where it is not desirable to present prompts, even though predefined inflexible rules would dictate it is desirable. This can conserve computational resources by preventing the rendering of prompts in various situations.

As also mentioned above, in some implementations, an interaction prediction model can be tailored to a user and/or to one or more client device(s) of a user. The interaction prediction model can be so tailored through training of the model based on multiple instances of observing interaction (and/or observing a lack of observation) with application(s)

on the basis of received and/or formulated electronic communications. As one example, for a given electronic communication, a trained interaction prediction model can be utilized to generate a predicted interaction value. Based on the predicted interaction value satisfying a threshold, a selectable interface element can be presented that, when selected, causes interaction with an application on the basis of the electronic communication. Further, it can be determined that the selectable interface element was not selected, and that no other interaction with the application on the basis of the given electronic communication occurred (e.g., content from the given electronic communication was not pasted or otherwise inputted into the application). A gradient can be determined based on the predicted interaction value and the determination that no interaction with the application occurred. For example, where the interaction prediction model is trained to generate predicted interaction values from 0.0 (indicating lowest likelihood of interaction) to 1.0 (indicating highest likelihood of interaction), the gradient can be determined based on comparing the predicted interaction value to "0.0" (since no interaction was observed). The gradient can then be utilized to update trained parameters of the model (e.g., through backpropagation of the gradient over at least a portion of the model).

As another example, for an additional electronic communication, the trained interaction prediction model can be utilized to generate an additional predicted interaction value. Based on the additional predicted interaction value satisfying a threshold, a selectable interface element can be presented that, when selected, causes interaction with an application on the basis of the electronic communication. Further, it can be determined that the selectable interface element was selected, or that some other interaction with the application on the basis of the given electronic communication occurred (e.g., content from the given electronic communication was pasted or otherwise inputted into the application). A gradient can be determined based on the predicted interaction value and the determination that interaction with the application occurred. For example, where the interaction prediction model is trained to generated predicted interaction values from 0.0 (lowest likelihood of interaction) to 1.0 (highest likelihood of interaction), the gradient can be determined based on comparing the predicted interaction value to "1.0" (since interaction was observed).

As yet another example, for a further electronic communication, the trained interaction prediction model can be utilized to generate a further predicted interaction value. Based on the further predicted interaction value failing to satisfy a threshold, no selectable interface element or other prompts are presented that, when selected, would cause interaction with an application on the basis of the electronic communication. However, it can be determined that some other interaction with the application on the basis of the given electronic communication occurred (e.g., content from the given electronic communication was pasted or otherwise inputted into the application). A gradient can be determined based on the predicted interaction value and the determination that interaction with the application occurred. For example, where the interaction prediction model is trained to generated predicted interaction values from 0.0 (lowest likelihood of interaction) to 1.0 (highest likelihood of interaction), the gradient can be determined based on comparing the predicted interaction value to "1.0" (since interaction was observed).

As also described above, in some implementations where the machine learning model is tailored, the model is stored locally at the client device(s) and the training to tailor the model is performed by the client device(s). This can enable training of the model based on potentially sensitive data, while maintaining security of the potentially sensitive data. This can additionally and/or alternatively conserve various network resources, as training to tailor the model can occur locally at the device and thereby obviate the need for transmission of training data to remote computer system(s) for tailoring of the model. Optionally, gradients determined locally at a client device during training (but not the training data itself) can be transmitted by the client device to remote computer system(s) for training and/or updating of a "global" model, that can then be pushed to the client device (and optionally other client devices) for local adaptation at the client device, by the client device (and optionally at the other client devices, by the other client devices). In implementations where gradients are transmitted by client devices for further training, without transmission of the underlying data utilized to generate the gradients, network resources can be conserved as the gradients can comprise less data than the corresponding data utilized to generate the gradients. Further, security of potentially sensitive data can be maintained, as the gradients themselves lack any potentially sensitive data that may be included in the corresponding data utilized to generate the gradients.

As also described above, in some implementations the training of the model by the client device includes training portion(s) of the model, while maintaining other portion(s) of the model as fixed. This can be computationally efficient and/or lead to quicker adaptation of the model to the user and/or client device(s). In some of those implementations, at least the portion(s) of the model, maintained as fixed during local training of the model by the client device, are initially trained by one or more computer systems remote from the client device, and are provided to the client device. In some of those implementations, the portion(s) of the model that are maintained as fixed are utilized to process tokens and/or other content of an electronic communication, to thereby generate an intermediary output such as an embedding. The intermediary output is then applied to the portion(s) that are trained and updated through local training by the client device. Additional input features can optionally be applied to the portion(s) along with the intermediary output, such as input features that indicate a current context of the client device and/or of a user of the client device. Such additional input features can be based on sensor data from sensor(s) of the client device (and/or of other client devices in communication with the client device), content currently and/or recently rendered by the client device, application(s) currently and/or recently accessed by the client device, etc. For example, such additional input feature(s) can include sensor data from an accelerometer and/or an inertial measurement unit of the client device, and/or a predicted activity determined based on such sensor data (e.g., running, walking, driving, biking, or stationary). As another example, such additional input features can additionally and/or alternatively include an application currently being utilized via the client device, an indication of whether a recipient and/or sender of an electronic message is a contact of the user, an indication of popularity (or other affinity measure) of the recipient and/or sender for the user, etc. As yet another example, the input features can additionally and/or alternatively include an indication of a time of the day, a day of the week, etc.

In some implementations, an interaction prediction model can be utilized to generate multiple predicted interaction values, that each indicate a likelihood of interaction with a corresponding application. Additionally, or alternatively, multiple interaction prediction models can be utilized, with each being utilized to generate at least one predicted interaction value for a corresponding application. In these and other manners, multiple predicted interaction values for multiple applications can be considered, and action(s) taken that are tailored to one or more of the multiple applications. As one example, for a given message a first predicted interaction value for a note-keeping application can be determined, and a second predicted interaction value for a Web-based spreadsheet application can be determined. If both predicted interaction values satisfy corresponding thresholds (optionally the same thresholds), then two separate prompts can be provided, each directed to a corresponding application. For instance, the first prompt can be "Add content to note-keeping application" and when selected, can cause content of the electronic message to be added to a list in the note-keeping application. Also, for instance, the second prompt can be "Add content to a spreadsheet" and when selected, can cause content of the electronic message to be added to one or more cells of a Web-based spreadsheet that can be edited via the Web-based spreadsheet application. Alternatively, if only one of the predicted interaction values satisfies a corresponding threshold, a prompt for its corresponding application can be provided, without providing any prompt or other output based on the other application. In these and other manners, multiple applications can be considered for a given message, and prompts provided for only those application(s) whose interaction values indicate a sufficient likelihood of interaction.

The above summary is presented as an overview of various implementations disclosed herein. Additional description is provided below of those implementations, and of various additional implementations.

In some implementations, a method implemented by one or more processors of a client device is provided that includes identifying an electronic communication that is received at the client device via a network interface of the client device, or is formulated at the client device via at least one user interface input device of the client device. Content of the electronic communication includes natural language content, and the method further includes applying, as at least part of input to a trained machine learning model that is stored locally at the client device: at least part of the natural language content of the electronic communication. The method further includes processing the input using the trained machine learning model to generate a predicted interaction value that indicates a likelihood of interaction with an application, accessible to the client device, on the basis of the electronic communication. The application is in addition to an electronic communication application via which the electronic communication is formulated, or via which the electronic communication is rendered after being received. The method further includes determining, based on the predicted interaction value, whether to present a selectable interface element via a display of the client device. The selectable interface element, when selected via user interface input at the client device, causes interaction with the application to provide at least part of the content of the electronic communication to the application. The method further includes determining whether any interaction, with the application on the basis of the electronic communication, occurs in response to selection of the selectable interface element or in response to other user interface input provided at the client device. The method further includes updating trained parameters of at least part of the trained machine learning model based on whether any interaction occurred with the application on the basis of the electronic communication, and using the trained machine learning model with the updated trained parameters in determining whether to present an additional selectable interface element for an additional electronic communication received or formulated at the client device.

This method and other implementations of technology disclosed herein may each optionally include one or more of the following features.

In some implementations, the trained machine learning model includes a first portion and a second portion. In some of those implementations, processing the input using the trained machine learning model includes processing the at least part of the natural language content using the first portion to generate first portion intermediary output, and processing the first portion intermediary output using the second portion. In some versions of those implementations, updating the trained parameters of the at least part of the trained machine learning model includes updating the second portion of the trained machine learning model without updating the first portion. In some versions of those implementations, the method further includes: determining one or more additional features; applying the one or more additional features to the second portion of the trained machine learning model as an additional part of the input to the trained machine learning model; and processing the one or more additional features using the second portion in processing the input using the trained machine learning model. In some of those versions, the one or more additional features are determined based on at least one of: sensor data from one or more sensors of the client device; and application data related to the electronic communication application via which the electronic communication is formulated, or via which the electronic communication is rendered in response to being received. For example, the one or more additional features can be determined based on the sensor data from the one or more sensors of the client device, such as a positional sensor, an accelerometer, and/or an inertial measurement unit. For instance, the one or more additional features can include a predicted status, of a user of the client device, that is predicted based on the sensor data. The one or more additional features can additionally and/or alternatively be based on one or more current temporal indications (e.g., a time of the day, a day of the week).

In some implementations, updating the trained parameters of the at least part of the trained machine learning model based on whether any interaction occurred with the at least one application on the basis of the electronic communication includes: determining a gradient based on whether any interaction occurred, and based on the predicted interaction value; and updating the trained parameters based on backpropagation of the gradient over the at least part of the trained machine learning model.

In some implementations, processing the input using the trained machine learning model is further to generate an additional predicted interaction value. The additional predicted interaction value indicates a likelihood of interaction with an additional application, accessible to the client device, on the basis of the electronic communication.

In some implementations, determining whether any interaction with the application on the basis of the electronic communication occurs, is in response to the other user interface input provided at the client device. In some of those implementations, the other user interface input includes pasting or typing at least some of the natural language input into the application.

In some implementations, the electronic communication application is a messaging application, and the application is a calendar application, a notes application, or a reminder application.

In some implementations, the method further includes generating, based on processing of tokens of the natural language content using a separate trained machine learning model, the at least part of the content of the electronic communication to provide to the application. In some of those implementations, the at least part of the content is a subset of the content, and the method further includes, based on the at least part of the content being generated using the separate trained machine learning model: causing selection of the selectable interface element to cause the interaction with the application to provide the at least part of the content to the application. In some version of those implementations, the method further includes incorporating at least a segment of the at least part of the content into the selectable interface element. In some additional and/or alternative versions of those implementations, causing the interaction with the application to provide the at least part of the content to the application includes causing the at least part of the content to be communicated to the application utilizing an application programming interface of the application.

In some implementations, the electronic communication is received at the client device via the network interface, and the electronic communication application is a messaging application. In some alternative implementations, the electronic communication is formulated at the client device via at least one user interface input device of the client device, and the at least part of the natural language content is received on a token-by-token basis via a keyboard application that renders an electronic keyboard via which the electronic communication is formulated.

In some implementations, a method implemented by one or more processors of a client device is provided that includes identifying an electronic communication. The electronic communication includes content, including natural language content, and the electronic communication is received at the client device via a network interface of the client device, or is formulated at the client device via at least one user interface input device of the client device. The method further includes determining whether any interaction occurs with an application on the basis of the electronic communication. The application is in addition to an electronic communication application via which the electronic communication is formulated, or via which the electronic communication is rendered after being received. The method further includes updating trained parameters of at least part of a trained machine learning model based on whether any interaction occurred with the application on the basis of the electronic communication. Updating the trained parameters includes: determining a gradient based on whether any interaction occurred, and based on a prediction value generated based on processing of features, of the electronic communication, using the trained machine learning model; and backpropagating the gradient over at least a portion of the trained machine learning model. The method further includes using, by the client device, the trained machine learning model with the updated trained parameters in determining whether to present an additional selectable interface element for an additional electronic communication received or formulated at the client device.

In some implementations, a method implemented by one or more processors of a client device is provided that includes identifying an electronic communication. The electronic communication includes content, including natural language content, and the electronic communication is received at the client device via a network interface of the client device, or is formulated at the client device via at least one user interface input device of the client device. The method further includes applying, as at least part of input to a trained machine learning model that is stored locally at the client device, tokens of the natural language content of the electronic communication. The method further includes processing the input using the trained machine learning model to generate a predicted interaction value that indicates a likelihood of interaction with an application, accessible to the client device, on the basis of the electronic communication. The application is in addition to an electronic communication application via which the electronic communication is formulated, or via which the electronic communication is rendered after being received. The method further includes determining, by the client device based on the predicted interaction value, to present a selectable interface element via a display of the client device. The method further includes, in response to selection of the selectable interface element: interfacing with the application to provide at least part of the content of the electronic communication to the application.

This method and other implementations of technology disclosed herein may each optionally include one or more of the following features.

In some implementations, the trained machine learning model includes a first portion and a second portion, and processing the input using the trained machine learning model includes processing the tokens using the first portion to generate first portion intermediary output, and processing the first portion intermediary output using the second portion. In some of those implementations, the method further includes determining one or more additional features, and applying the one or more additional features to the second portion of the trained machine learning model as an additional part of the input to the trained machine learning model. In those implementations, processing the input using the trained machine learning model further includes processing the one or more additional features using the second portion.

In some implementations, processing the input using the trained machine learning model is further to generate an additional predicted interaction value that indicates a likelihood of interaction with an additional application, accessible to the client device, on the basis of the electronic communication. In some of those implementations, the method further includes determining, based on the predicted interaction value and the additional predicted interaction value: to present the selectable interface element that, when selected, interfaces with the application, without presenting any selectable interface element that, when selected, interfaces with the additional application to provide any part of the content of the electronic communication to the additional application.

In some implementations the method further includes: generating, based on processing of the tokens using a separate trained machine learning model, the at least part of the content of the electronic communication to provide to the application. The at least part of the content can be a subset of the content, and the method can further include, based on the at least part of the content being generated using the separate trained machine learning model: causing selection of the selectable interface element to cause interfacing with the application to provide the at least part of the content to the application. In some of those implementations, generating the at least part of the content of the electronic communication to provide to the application is contingent on determining that the predicted interaction value satisfies a threshold.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is a flow chart illustrating an example method of determining whether to provide a prompt for an interaction on the basis of an electronic communication, based on a generated predicted interaction value for the electronic communication, according to various implementations disclosed herein.

FIG. 5 is a flow chart illustrating an example method of updating a local interaction prediction model, according to various implementations disclosed herein.

FIG. 6 is a flow chart illustrating an example method of updating a local content model, according to various implementations disclosed herein.

FIG. 7A, FIG. 7B, FIG. 8A, FIG. 8B, FIG. 9, and FIG. 10 illustrate example graphical user interfaces for providing selectable graphical elements that, when selected, cause interaction with a corresponding application to provide at least part of a corresponding electronic communication to the corresponding application.

DETAILED DESCRIPTION

Figure 1:
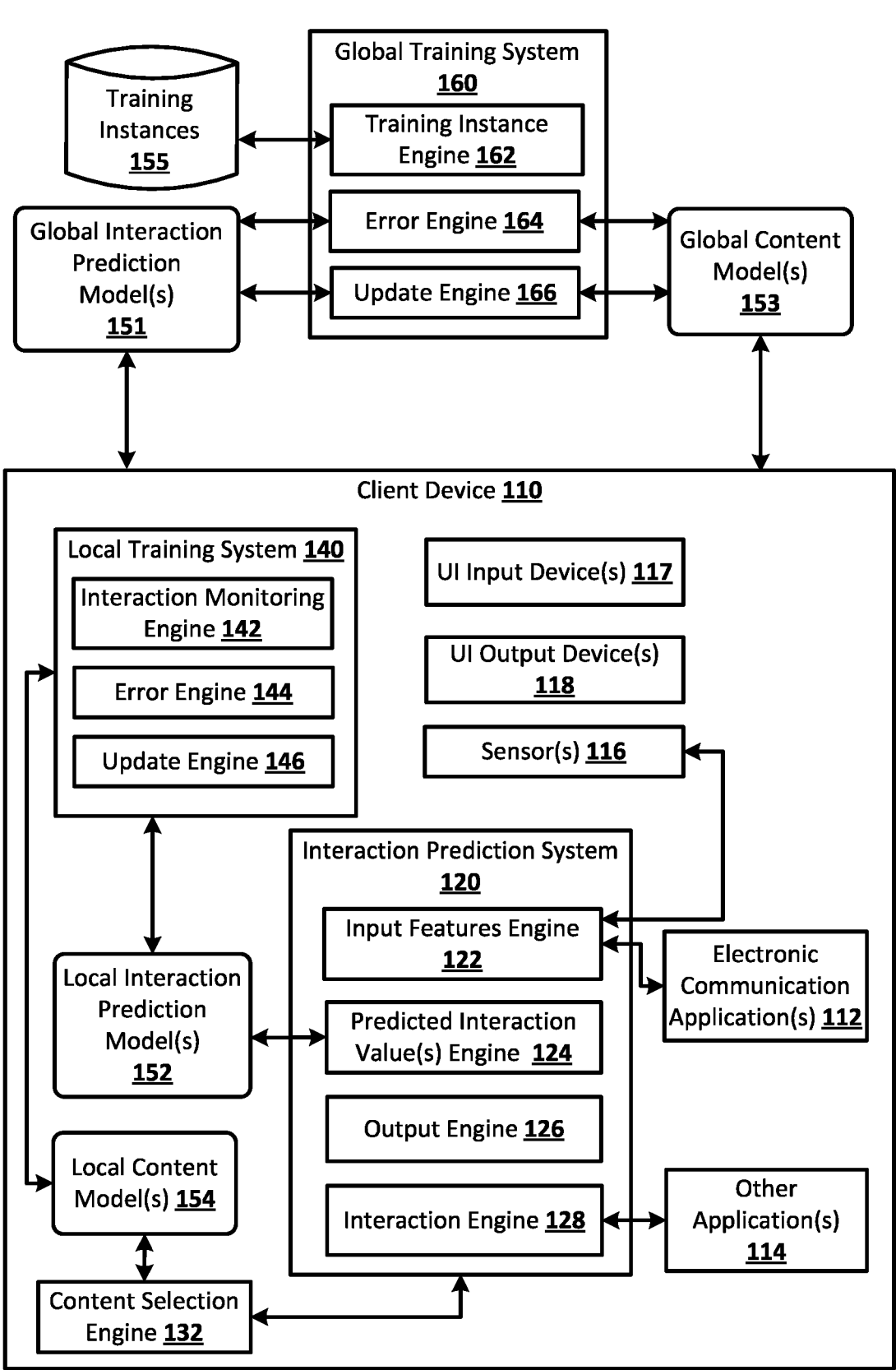
FIG. 1 illustrates an example environment in which implementations disclosed herein may be implemented.

FIG. 1 illustrates an example environment in which implementations disclosed herein may be implemented. The example environment includes a global training system 160 that trains global interaction prediction model(s) 151 and global content model(s) 153. The example environment also includes a client device 110. The global training system 160 provides global interaction prediction model(s) 151 and global content model(s) 153 to client devices, such as client device 110, for use by the client devices in the performance of various techniques described herein. The models 151 and 153 can be preloaded on the client device 110 and/or other client devices, and/or can be transmitted to the client device 110 and/or other client devices over one or more communication networks, such as the Internet. As described in more detail herein, instances of the models 151 and 153 can be stored locally at each of the client devices as local models, and optionally locally updated by each of the client devices to tailor the local model to the client device and/or to a user of the client device. For example, client device 110 is illustrated as storing local interaction prediction model(s) 152 and local content model(s) 154, which can be tailored versions of the models 151 and 153 that are tailored to the client device 110 and/or to a user of the client device 110, through observed interactions (and/or observed lack of interactions) at the client device 110 (and/or other client devices of the user).

The global interaction prediction model(s) 151 trained by the global training system 160 can each accept, as input, tokens and/or other features of an electronic communication—and optionally feature(s) that are independent of the electronic communication. The model(s) 151 can be utilized to process the input to generate one or more predicted interaction values. Each predicted interaction value indicates a likelihood of interaction with an application (and optionally a specific functionality of the application) on the basis of the electronic communication. For example, one of the model(s) 151 can be configured to generate only one predicted interaction value as output, and that predicted interaction value can indicate a likelihood of interaction with any application on the basis of the electronic communication, or a likelihood of interaction with a particular application (e.g., a note-keeping application) on the basis of the electronic communication. Also, for example, one of the model(s) 151 can be configured to generate multiple predicted interaction values as output, such as a first predicted interaction value that indicates a likelihood of interacting with a first application (e.g., a calendar application) on the basis of the electronic communication, and a second predicted interaction value that indicates a likelihood of interacting with a second application (e.g., a note-keeping application) on the basis of the electronic communication. As yet another example, one of the model(s) 151 can additionally or alternatively be configured to generate multiple predicted interaction values as output, such as a first predicted interaction value that indicates a likelihood of interacting with a first functionality of an application (e.g., a "shopping list" functionality of a note-keeping application) on the basis of the electronic communication, and a second predicted interaction value that indicates a likelihood of interacting with a second functionality of the application (e.g., a general "to-do list" of the note-keeping application) on the basis of the electronic communication.

The global content model(s) 153 trained by the global training system 160 can each accept, as input, tokens and/or other features of an electronic communication. The model(s) 153 can be utilized to process the input to generate a reformulation of the content of the electronic communication. For example, the reformulation can be a summarization of all or portions of the natural language input of the electronic communication, or an extraction of a subset of the electronic communication. For instance, for an electronic message of "Can you bring milk from the store on your way home", a reformulation can be the extracted subset of "bring milk from the store" or the summarization "get milk @ store on way home". As described herein, in some implementations, the global content model(s) 153 are trained by the global training system 160. In additional and/or alternative implementations, pre-trained text summarization and/or text extraction models can be utilized as the global content model(s) 153, or global content model(s) 153 (and their local counterparts) can even be omitted in various implementations (e.g., and an entirety of natural language content and/or other content of an electronic communication instead provided to applications).

As described herein, token(s) of electronic communications can be applied as at least part of the input to various models, and processed utilizing the models. A "token", as used herein, includes a sequence of one or more characters of natural language input of an electronic message. For example, a token can be a single term or other n-gram (e.g., tokens can be "cab", "Chicago", "New York", "2"). In various implementations, a token from an electronic communication can optionally be a standardized or otherwise transformed version of a corresponding n-gram. For example, a natural language processing engine can be utilized to process text in an electronic communication and can remove capitalizations, transform dates to a standard format, transform relative temporal terms to a standard format (e.g., transform "tomorrow" to a date that corresponds to "tomorrow), transform numbers to a generic identifier (e.g., transform any number to "#"), etc. Although various examples are described herein with respect to utilizing tokens of an electronic communication as input features, various additional and/or alternative features of an electronic communication can be utilized as input features to one or more models described herein. For example, various metadata of the electronic communication can be utilized. Also, for example, a natural language processing engine can annotate various types of grammatical information in an electronic communication, and such annotations can additionally and/or alternatively be utilized. Grammatical information can include, for example, parts of speech of terms (e.g., "noun," "verb," "adjective," "pronoun"), syntactic relationships between terms, entity annotations/tags of terms (e.g., annotations of references to people, organizations, locations, and so forth), and/or co-reference resolutions (that resolve multiple references to the same entity based on one or more contextual cues).

The global training system 160 trains the global interaction prediction model(s) 151 and/or the global content model(s) 153 utilizing training instance 155. The training instances 155 include a large quantity of training instances for training the global interaction prediction model(s) 151 and optionally include a large quantity of separate training instances for training the global content model(s) 153.

Each of the training instances for training the model(s) 151 can include training instance input that is based at least in part on content of a corresponding electronic communication, and training instance output that includes, for each of one or more interactions, a corresponding interaction value that indicates a likelihood of the interaction. For example, for a communication of "pick up avocados from the store", a training instance can be generated that includes training instance input that includes tokens of the communication (e.g. that includes "pick up avocados from the store") and that includes training instance output that includes, for an interaction with a "shopping list" feature of a notes application, a positive interaction value (e.g., "1"). Also, for example, for a communication of "how are you today?", a training instance can be generated that includes training instance input that includes tokens of the communication and that includes training instance output that includes, for an interaction with a "shopping list" feature of a notes application, a negative interaction value (e.g., "0").

The training instances 155 for training the global interaction prediction model(s) 151 can be based on human-labeled electronic communications, such as human labeling of publicly available emails, chat logs, etc. The training instances 155 for training the global interaction prediction model(s) 151 can additionally and/or alternatively be based on automatically labeled (i.e., without human review in labeling) communications. For example, for a given electronic communication, a positive interaction value can be automatically determined, for training instance output of a training instance that is based on the given electronic communication, based on detecting a copying of content of the given electronic communication and a pasting of the content into an application, and/or based on otherwise determining that content of the given electronic communication was provided to the application through user interface input (optionally within a threshold time of creating or consuming the given electronic communication).

Each of the training instances for training the global content model(s) 153 can include training instance input that is based at least in part on content of a corresponding electronic communication, and training instance output that includes a reformulation of the content. For example, for a communication of "Hi, please pick up avocados from the store", a training instance can be generated that includes training instance input that includes tokens of the communication (e.g. that includes "Hi, please pick up avocados from the store") and that includes training instance output that includes an extraction or summarization of the tokens (e.g., "pick up avocados" or "pick up avocados from store"). The training instances 155 for training the global content model(s) 153 can be based on human-curated original content, reformulated content pairs. The training instances 155 for training the global content model(s) 153 can additionally and/or alternatively be based on automatically determined (i.e., without human review) original content, reformulated content pairs. For example, for a given electronic communication, the original content of an original content, reformulated content pair can be automatically determined based on tokens of the given electronic communication, and the reformulated content of the pair can be determined based on content that is inputted into an application on the basis of the given electronic communication (e.g., content that is copied from the given electronic communication and pasted into the application).

In training one of the models 151 or 153, the training instance engine 162 of the global training system 160 selects a corresponding training instance from training instances 155, and processes training instance input, of the training instance, using the corresponding model and its current learned parameters, to generate a predicted output. The error engine 164 of the global training system 160 compares the predicted output to the training instance output, of the training instance, to generate an error. The update engine 166 of the global training system 160 updates trained parameters of the corresponding model based on the error. For example, the error can be backpropagated over the corresponding model. Batch learning and/or non-batch learning techniques can be utilized in generating errors and/or other gradients, and in updating the corresponding model based on the gradients.

The global interaction prediction model(s) 151 can each be a machine learning model, such as a neural network model. For example, one of the interaction prediction model(s) 151 can include one or more memory layers that each include one or more memory units. A memory unit can be a long short-term memory ("LSTM") unit. In some implementations, additional or alternative memory unit(s) may be utilized such as a gated recurrent unit ("GRU"). For instance, an initial input layer can be a bi-directional LSTM layer and tokens can be applied as inputs to the layer on a token-by-token basis to corresponding inputs of the bi-directional LSTM layer. As another example, one of the global interaction prediction model(s) 151 can additionally and/or alternatively include one or more convolutional layers and/or other layers. The global content model(s) 153 can each also be a machine learning model, such as a neural network model with one or more memory layers and/or convolutional layers.

Client device 110 is illustrated as storing local interaction prediction model(s) 152 and local content model(s) 154, which can be tailored versions of the models 151 and 153 that are tailored to the client device 110 and/or to a user of the client device 110, through observed interactions (and/or observed lack of interactions) at the client device 110 (and/or other client device(s) of the user).

The client device 110 also includes an interaction prediction system 120, a local training system 140, a content selection engine 132, electronic communication application(s) 112, and other application(s) 114. The client device 110 further includes user interface (UI) input device(s) 117, UI output device(s) 118, and sensor(s) 116. The UI input devices 117 can include, for example, a keyboard, a touchscreen, a microphone, and/or a mouse. The UI output device(s) 118 can include, for example, speaker(s) and/or display(s). The sensor(s) 116 can be in addition to the UI input device(s) and can include an accelerometer, a GPS and/or other positional sensor, an IMU, camera(s), etc. The client device 110 can include additional and/or alternative components not illustrated in FIG. 1 for the sake of brevity, such as one or more components of the example computing system of FIG. 11.

The interaction prediction system 120, the local training system 140, the content selection engine 132, and the models 152 and 154 are illustrated as being local to the client device 110, and in many implementations are local to the client device 110. However, in other implementations one or more of the components can be implemented at least in part on device(s) that are remote from the client device 110. For example, in some of those other implementations the client device 110 can interact with one or more additional client devices of the user, such as client devices that are on the same local network, and the additional client device(s) may implement all or aspects of one or more components. In such an example, the multiple client device(s) may effectively "share" one or more components through electronic communications between the devices, while still maintaining data security as a result of the electronic communications being on the local network.

The interaction prediction system 120 includes an input features engine 122, a predicted interaction value(s) engine 124, an output engine 126, and an interaction engine 128.

The input features engine 122 determines input features for an electronic communication, such as an electronic communication being formulated at the client device 110, or being received and/or viewed (or listened to) at the client device 110. The input features engine 122 can determine the input features based on content of the electronic communication and/or based on contextual features, such as contextual features at the time of creating and/or viewing the electronic communication. The input features that are based on the content of the electronic communication can be received from a corresponding one of the electronic communication application(s) 112. The electronic communication application(s) 112 can include, for example, a keyboard application (e.g., when the electronic communication is being created) and/or a messaging application that enables viewing and/or creating of electronic communication(s) (e.g., a chat messaging application). In some implementations, the input feature(s) engine 122 can receive the content from a corresponding one of the electronic communication application(s) 112 (e.g., via an API). In some additional and/or alternative implementations, the input feature(s) engine 122 can extract the content based on a "screenshot" from when the corresponding one of the electronic communication application(s) 112 is rendering the electronic communication (e.g., by extracting tokens from the screenshot).

The input features (if any) that are based on contextual features can be based on sensor data from one or more of the sensor(s) 116. For example, such input feature(s) can include sensor data from an accelerometer and/or an inertial measurement unit of the sensor(s) 116, and/or a predicted activity determined based on such sensor data. As another example, input features (if any) that are based on contextual features can additionally and/or alternatively be based on an indication of whether a recipient and/or sender of an electronic message is a contact of the user (e.g., using locally stored contact data), an indication of popularity (or other affinity measure) of the recipient and/or sender for the user (e.g., using locally stored contact data), an indication of a time of the day, a day of the week, etc.

The predicted interaction value(s) engine 124 processes the determined input features using the local interaction prediction model(s) 152 to generate one or more predicted interaction values. Each predicted interaction value indicates a likelihood of interaction with a corresponding one or more of the other application(s) 114 on the basis of the electronic communication. As described herein, the local interaction prediction model(s) 152 can be tailored version(s) of the global interaction prediction model(s) 151, that have been tailored through further training by local training system 140. In some of those implementations, the local interaction prediction model(s) 152 can be of the same structure as the global content models(s) 153 (e.g., have the same input dimensions, the same output dimensions, and the same layer(s)), but can include updated trained parameters (relative to the model(s) 153) as a result of further training at the client device 110. In some additional and/or alternative implementations, the local interaction prediction model(s) 152 can be of a different structure than the global content model(s) 153. For example, a local interaction prediction model can include trained layer(s) that are in addition to layer(s) of the model(s) 153 and/or can be trained based on various input features that are in addition to those utilized in training the model(s) 153 (e.g., additionally trained based on contextual input features). One particular instance of this is described in more detail below with respect to FIGS. 3A and 3B.

The output engine 126 utilizes the predicted interaction value(s) to determine whether to render a graphical and/or audible prompt(s), each of which, when responded to with affirmative user interface input, causes interaction with a corresponding one of the other application(s) 114 to provide at least part of the content of the electronic communication to the corresponding application. For example, the output engine 126 can generate a prompt that corresponds to a given one of the other application(s) 114 based on determining that a determined predicted interaction value corresponding to the application satisfies a threshold. The prompt can be rendered by the output engine 126 graphically and/or audibly via one or more of the UI output device(s) 118.

The interaction engine 128 interfaces with a corresponding one of the application(s) 114 in response to affirmative input being received in response to the prompt (i.e., via user interaction with one of the UI input device(s) 117). For example, the interaction engine 128 can provide content from the electronic communication to the application via an API. In some implementations, the application is fully local to the client device 110. In some other implementations, the application is at least partially (e.g., fully) implemented remote from the client device 110 and providing the content comprises transmitting the further content over one or more networks. As described herein, in some implementations the interaction engine 128 may automatically interface with the application without the output engine 126 first providing a prompt and/or without first otherwise requiring affirmative input. For example, if predicted interaction values range from 0.0 (lowest) to 1.0 (highest), the output engine 126 can first provide a prompt if the predicted interaction value is between 0.6 and 0.9. However, if the predicted interaction value is 0.9 or higher, the interaction engine 128 can automatically interface with the application without the output engine 126 first providing a prompt. For completeness of the example, if the predicted interaction value is less than 0.6, no prompts and/or automatic interactions will occur (e.g., output engine 126 will suppress provision of any prompt on the basis of the electronic communication).

In some implementations, the interaction engine 128 interfaces with the content selection engine 132 to determine which parts of the content of an electronic communication to provide to one of the other application(s) 114. The content selection engine 132 can process tokens of the electronic communication utilizing local content model(s) 154 to determine the content of the electronic communication to provide to the application. In some of those implementations, the content selection engine 132 determines the content to provide only in response to the output engine 126 and/or the interaction engine 128 determining a predicted interaction value satisfies a threshold, or only in response to receiving affirmative user interface in response to a prompt provided by the output engine 126. This can conserve computational resources by only selectively processing of electronic communications using the content selection engine 132 (e.g., only when the interaction prediction system determines a predicted interaction value that satisfies a threshold).

The local training system 140 updates the local interaction prediction model(s) 152 and/or the local content model(s) 154 based on observations of interaction (and/or observations of lack of interaction), with one or more of the other application(s) 114 on the basis of various electronic communications. The local training system 140 includes an interaction monitoring engine 142, an error engine 144, and an update engine 146.

In updating the local interaction prediction model(s) 152, the interaction monitoring engine 142 monitors to determine whether, at the client device 110 in response to user interface input, interactions with one or more of the other application(s) 114 occur on the basis of various electronic communications. For example, the interaction monitoring engine 142 can determine interaction based on affirmative input being received in response to a prompt provided by the output engine 126. Also, for example, the interaction monitoring engine 142 can determine interaction based on detecting a copying of content of a given electronic communication and a pasting of the content into one of the other application(s) 114. As yet another example, the interaction monitoring engine 142 can determine interaction based on otherwise determining that content of a given electronic communication was provided to one of the other application(s) through user interface input (e.g., typed and/or spoken user interface input). Moreover, the interaction monitoring engine 142 can determine lack of interaction based on such previously mentioned inputs not being detected.

In updating the local interaction prediction model(s) 152, for each interaction/lack of interaction determined by the interaction monitoring engine 142, the error engine 144 can determine an error based on a predicted interaction value for the corresponding electronic communication (determined utilizing a current version of the local interaction prediction model(s) 152), and based on whether an interaction or lack of interaction was determined. As one example, where the interaction prediction model is trained to generated predicted interaction values from 0.0 (indicating lowest likelihood of interaction) to 1.0 (indicating highest likelihood of interaction), and a lack of interaction is determined, the error can be determined based on comparing the predicted interaction value to "0.0" (since no interaction was observed).

In updating the local interaction prediction model(s) 152, the update engine 146 updates trained parameters of the corresponding local interaction prediction model based on the error. For example, the error can be backpropagated over the corresponding model. Batch learning and/or non-batch learning techniques can be utilized in generating errors and/or other gradients, and updating the corresponding model based on the gradients.

The local training system 140 can additionally and/or alternatively be utilized to update the local content model(s) based on observations of content that is provided to the other application(s) on the basis of various communications. As one example, the interaction monitoring engine 142 can determine content that is copied from a given electronic communication, and pasted into a corresponding one of the other application(s) 114, based on user interface input from a user. The error engine 144 can process the given electronic communication using one of the local content model(s) 154 to generate predicted content for providing to the one of the other application(s) 114. The error engine 144 can generate an error based on comparing the generated predicted content to the actual content pasted. The update engine 146 can then update the local content model based on the error (e.g., backpropagate the error).

Figure 2A:
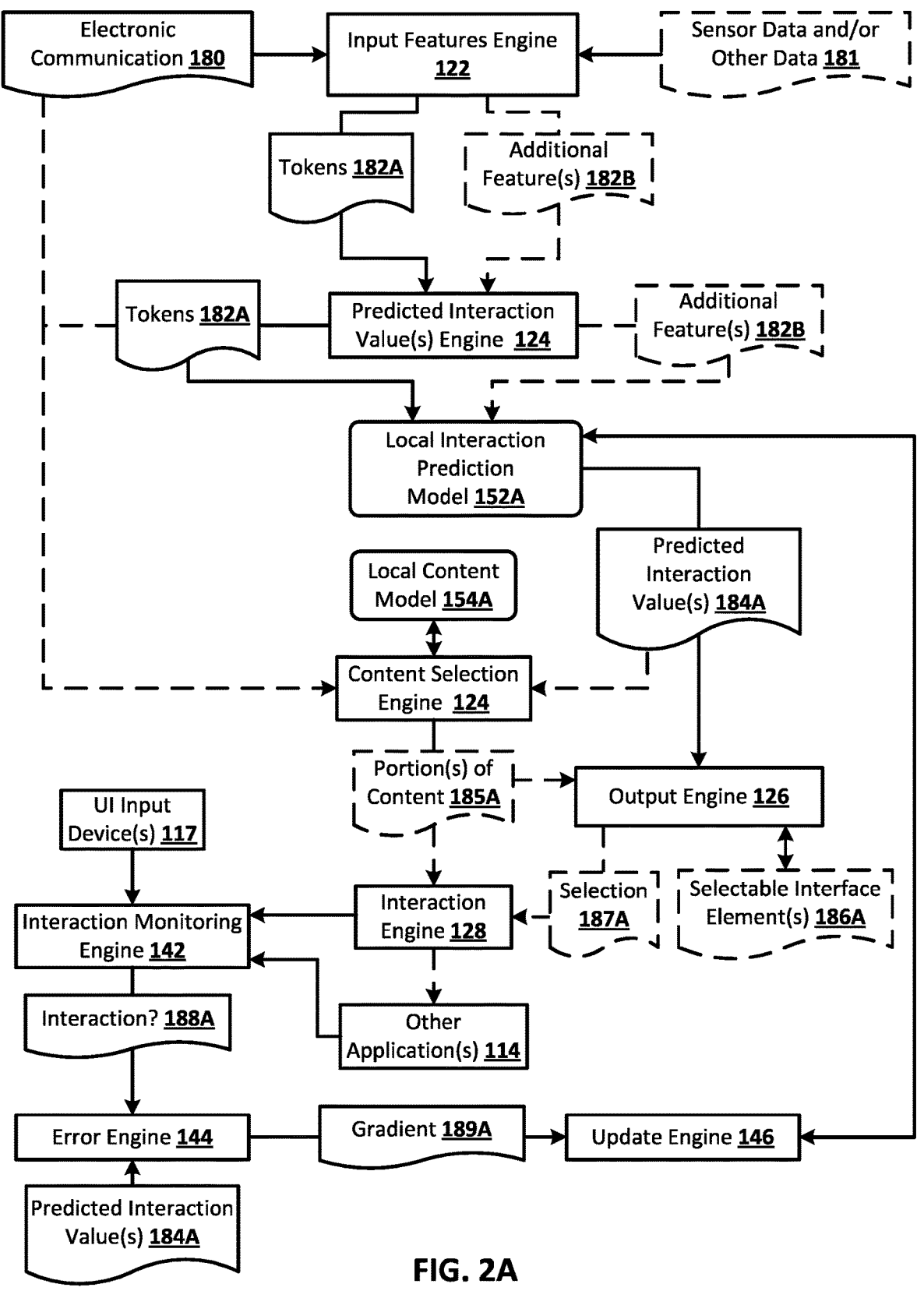
FIG. 2A illustrates an example of interactions that can occur between various components of FIG. 1 to update a local interaction prediction model based on interaction (or lack of interaction) with an application on the basis of an electronic communication, according to various implementations disclosed herein.

Turning now to FIGS. 2A-3B, additional description is provided of various implementations of components of FIG. 1. FIG. 2A illustrates an example of interactions that can occur between various components of FIG. 1 to update a local interaction prediction model 152A based on interaction (or lack of interaction) with an application on the basis of an electronic communication, according to various implementations disclosed herein.

In FIG. 2A, the input features engine 122 determines input features based on an electronic communication 180, and optionally based on sensor data and/or other data 181. The electronic communication 180 can be one being formulated at the client device 110 by a user of the client device, or one received by and/or being rendered (e.g., graphically) at the client device 110. The input features determined by the input features engine 122 include tokens 182A of the electronic communication 180. The input features optionally additionally include additional feature(s) 182B. The additional features 182B can be additional features of the electronic communication 180 and/or additional features based on sensor data (from sensors of the client device 110) and/or other data 181.

The tokens 182A and optionally the additional feature(s) 182B are processed, by the predicted interaction value(s) engine 124, utilizing the local interaction prediction model 152A. The local interaction prediction model 152A is one of (and optionally the only one of) the local interaction prediction model(s) 152 of FIG. 1. The predicted interaction value(s) engine 124 processes the input features, utilizing the local interaction prediction model 152A, to generate one or more predicted interaction values 184A.

The predicted interaction value(s) 184A are provided to the output engine 126, and optionally to the content selection engine 124. The output engine 126 utilizes the predicted interaction value(s) 184A to determine whether to cause one or more selectable interface elements 186A to be rendered. For example, if predicted interaction value(s) 184A include a predicted interaction value that satisfies a threshold and that corresponds to a given application, the output engine 126 can cause a selectable interface element, that corresponds to the given application, to be rendered. If the output engine 126 provides selectable interface element(s) 186A, it monitors for a selection of any one of the selectable interface element(s) 186A. If a selection is detected, the output engine 126 provides an indication of the selection 187A to the interaction engine 128.

The interaction engine 128, in response to receiving the indication of the selection 187A, provides one or more of the portion(s) of content 185A of the electronic communication 180 to at least one of the other application(s) 114 that corresponds to the selected selectable interface element.

The portion(s) of the content 185A can be determined by the content selection engine 124 based on processing of the tokens 182A and/or other features of the electronic communication, using the local content model 154A. The local content model 154A is one of (e.g., the only one of) the local content model(s) 154 of FIG. 1. In some implementations, the content selection engine 124 determines the portion(s) of content 185A in response to determining that one or more of the predicted interaction value(s) 184A satisfies a threshold. For example, the content selection engine 124 can determine the portion(s) of content 185A only when one or more of the predicted interaction value(s) 184A is sufficient for causing the output engine 126 to provide one or more selectable interface elements 186A. In some implementations, the output engine 126 also utilizes one or more of the portion(s) of content 185A in generating one or more of the selectable interface elements 186A. For example, the output engine 126 can incorporate at least some of the portion(s) of content 185A into one of selectable interface element(s) 186A to provide an indication of content that will be provided to a corresponding one of the other application(s) 114 in response to selection of the selectable interface element.

The interaction monitoring engine 142 interfaces with the interaction engine 128, the other application(s) 114, and/or the UI input device(s) 117 to determine whether an interaction with at least one of the other application(s) 114 occurs on the basis of the electronic communication 180. For example, if the interaction engine 128 provides one or more of the portion(s) of content 185A of the electronic communication 180 to at least one of the other application(s) 114 in response to receiving the indication of the selection 187A, the interaction monitoring engine 142 can determine an interaction occurred. Absent the interaction engine 128 providing one or more of the portion(s) of content 185A, the interaction monitoring engine 142 may nonetheless determine an interaction occurred if user interface input from UI input device(s) 117 and/or one or more of the other application(s) 114 indicates that content from the electronic communication 180 was provided to one or more of the other application(s) 114. Otherwise, the interaction monitoring engine 142 can determine a lack of interaction on the basis of the electronic communication.

The interaction monitoring engine 142 provides interaction indication 188A to the error engine 144. The interaction indication 188A indicates whether an interaction occurred on the basis of the electronic communication 180. The error engine 144 generates an error or other gradient 189A based on comparing the interaction indication 188A to the predicted interaction value(s) 184A. The update engine 146 updates the local interaction prediction model 152A based on the gradient 189A. For example, the update engine 146 can backpropagate the gradient 189A over the entirety of the local interaction prediction model 152A.

Figure 2B:
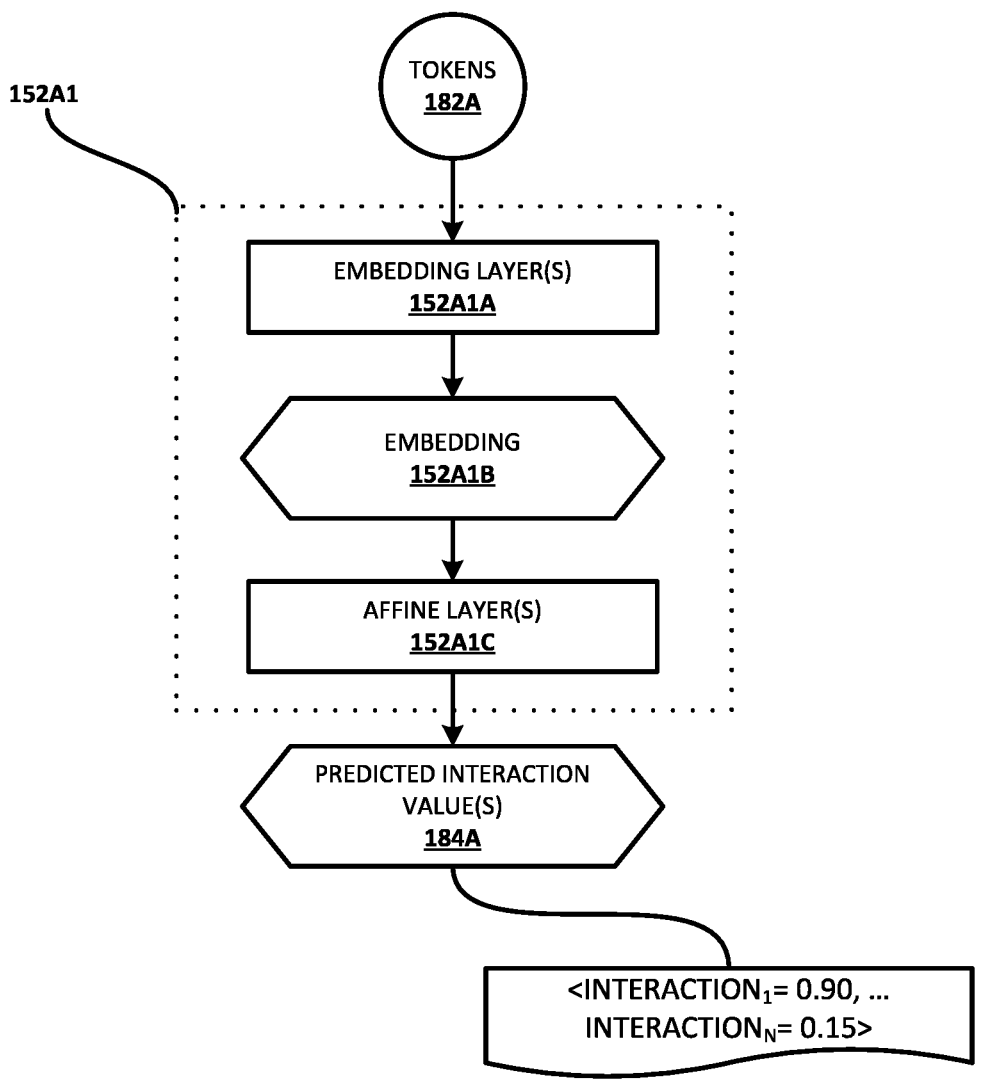
FIG. 2B illustrates an example of the local interaction prediction model of FIG. 2A.

FIG. 2B illustrates an example 152A1 of the local interaction prediction model 152A of FIG. 2A. The example 152A1 includes one or more embedding layer(s) 152A1A. The embedding layer(s) 152A1A can include LSTM and/or convolutional layers and can be utilized to process the tokens 182A to generate an embedding 152A1B. It is noted that the embedding 152A1B is generated over the example model 152A1 using the tokens 182A and the embedding layer(s) 152A1A, but does not itself form part of the example model 152A1. The generated embedding 152A1B can be applied to affine layer(s) 152A1C to generate the predicted interaction value(s) 184A. The affine layer(s) 152A1C can include, for example, one or more Softmax layers. As illustrated in FIG. 2B, the predicted interaction value(s) 184A can include predicted interaction values for each of multiple interactions (Interaction$_1$ through Interaction$_N$), where each interaction is for a corresponding one of the other application(s) 114 (and optionally to a corresponding particular functionality of the corresponding one of the other application(s) 114). In other implementations, only a single predicted interaction value is generated.

In some implementations, the example 152A1 of FIG. 2B can conform in structure to one of the global interaction model(s) 151 trained by the global training system 160. However, it has updated parameters as a result of further training at the client device 110, such as the training described with respect to FIG. 2A.

Figure 2C:
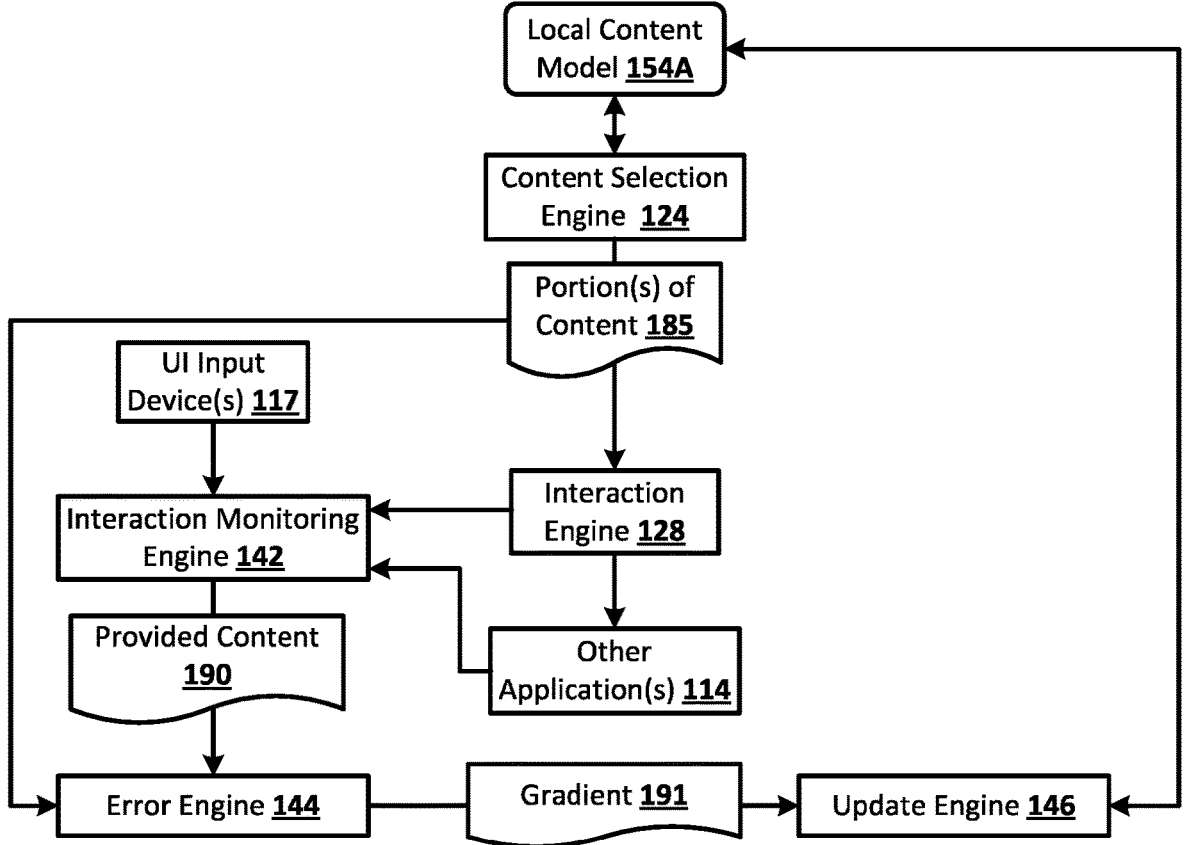
FIG. 2C illustrates an example of further interactions that can occur between various components of FIG. 1 to update a local content model based on interaction with an application on the basis of an electronic communication, according to various implementations disclosed herein.

FIG. 2C illustrates an example of further interactions that can occur between various components of FIG. 1 to update the local content model 154A of FIG. 2A based on interaction with an application on the basis of an electronic communication, according to various implementations disclosed herein. In FIG. 2C, the interaction monitoring engine 142 determines what provided content 190 was actually provided to the one of the other application(s) 114 on the basis of the electronic communication 180 (FIG. 2A). For example, if the interaction engine 128 provided the portion(s) of content 185 to one of the other application(s) 114 without the user editing such content, the provided content 190 can conform to the portion(s) of content 185. If, on the other hand, the user edited the content provided by the interaction engine 128—or provided separate content independent of interaction engine 128, the interaction monitoring engine can determine provided content 190 that is different than the portion(s) of content 185. For example, if the user did not select any prompt provided in FIG. 2A, and instead manually copied text from the electronic communication 180 and pasted it into one of the other application(s) 114, the interaction monitoring engine 142 can utilize the copied and pasted text as the provided content 190. The interaction monitoring engine 142 can determine such text by interfacing with the UI input device(s) 117 and/or the other application(s) 114. The error engine 144 generates an error or other gradient 191 based on comparing the provided content 190 to the portion(s) of content 185 generated by the content selection engine 124 utilizing the local content model 154A. The update engine 146 updates the local content model 154A based on the gradient 191. For example, the update engine 146 can backpropagate the gradient 191 over the entirety of the local content model 154A.

Figure 3A:
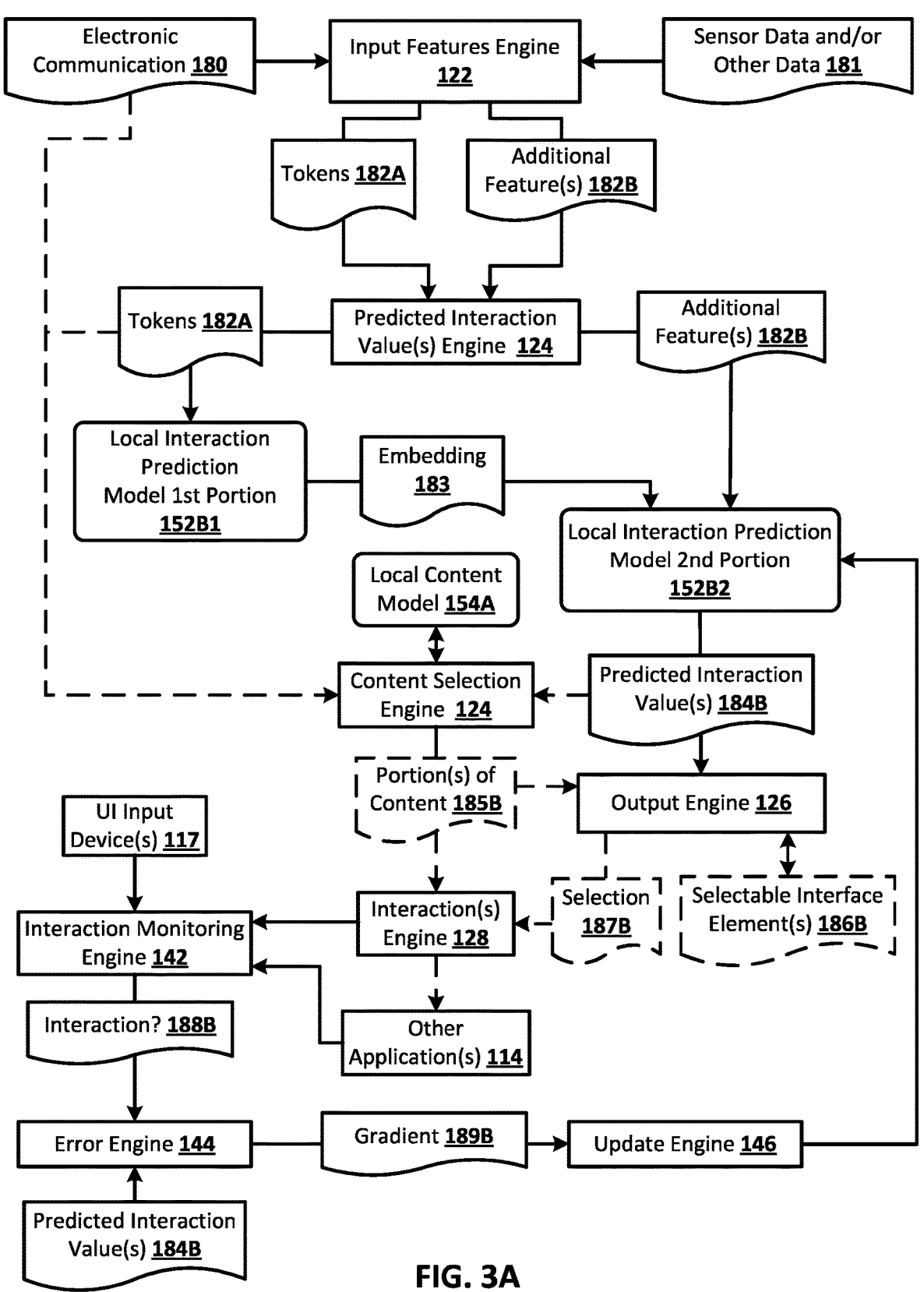
FIG. 3A illustrates another example of interactions that can occur between various components of FIG. 1 to update a portion of a local interaction prediction model based on interaction (or lack of interaction) with an application on the basis of an electronic communication, according to various implementations disclosed herein.

FIG. 3A illustrates another example of interactions that can occur between various components of FIG. 1 to update a portion of a local interaction prediction model based on interaction (or lack of interaction) with an application on the basis of an electronic communication, according to various implementations disclosed herein.

In FIG. 3A, the local interaction prediction model includes a first portion 152B1 and a second portion 152B2. The local interaction prediction model of FIG. 3A can be one (e.g., the only one) of the local interaction prediction models 152 of FIG. 1. For example, the local interaction prediction model of FIG. 3A can be utilized in lieu of the local interaction prediction model 152A of FIG. 2A.

Figure 3B:
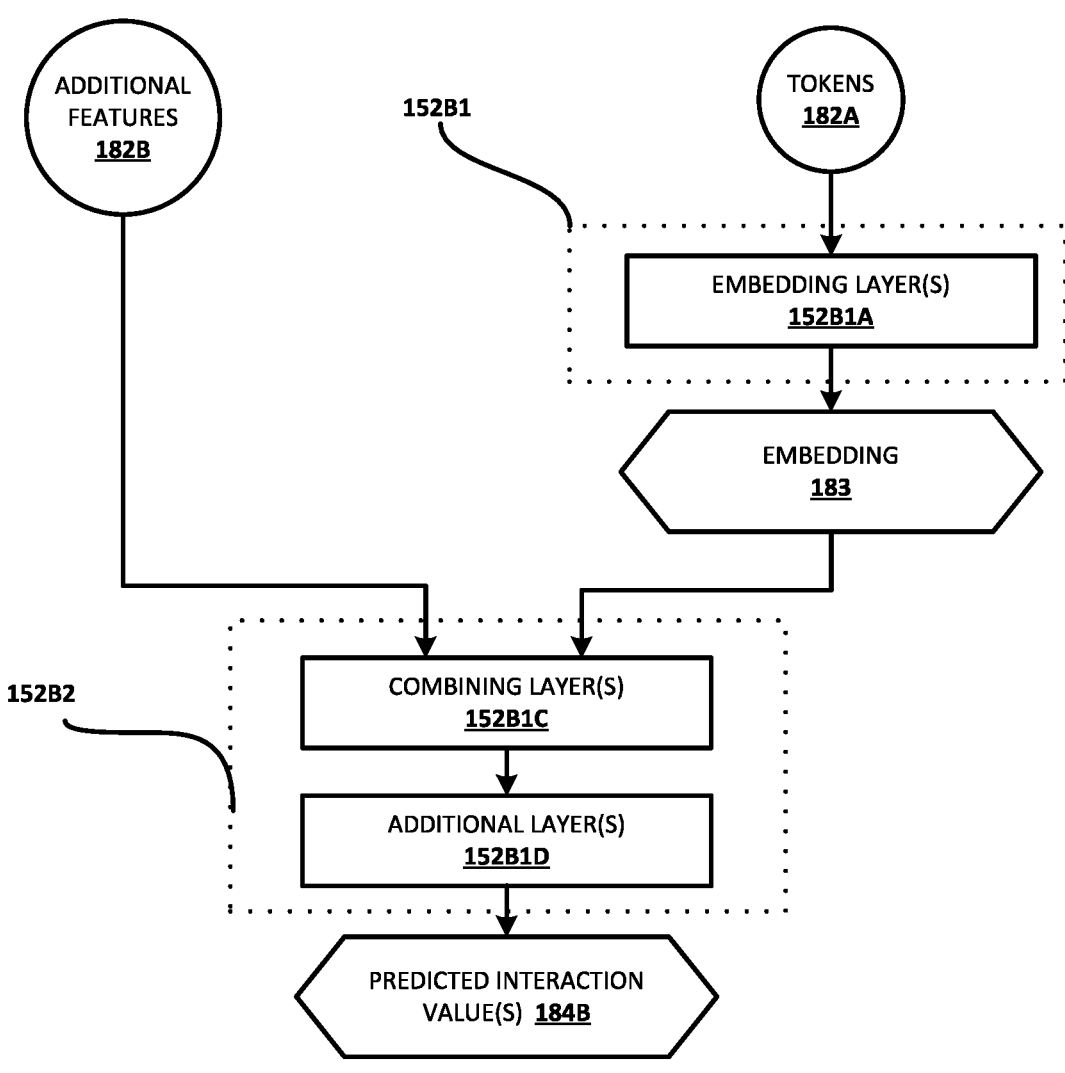
FIG. 3B illustrates an example of the local interaction prediction model of FIG. 3A.

As illustrated in FIG. 3B, the first portion 152B1 can include embedding layer(s) 152B1A. The embedding layer(s) 152B1A can include LSTM and/or convolutional layers and can be utilized to process the tokens 182A to generate an embedding 183. The generated embedding 183 can be applied to combining layer(s) 152B1C of the second portion 152B2, along with the additional features 182B. Output generated over the combining layers 152B1C based on applying the embedding 183 and the additional features 182B can be processed over one or more additional layer(s) 152B1D to generate predicted interaction value(s) 184B. The additional layer(s) 152B1D can include, for example, one or more affine layer(s).

In various implementations, the first portion 152B1 is a portion of one of the global interaction prediction model(s) 151 of FIG. 1 that is trained by global training system 160. For example, the first portion 152B1 can include memory layer(s) of one of the global interaction prediction model(s) 151 of FIG. 1, with downstream affine layer(s) and/or other layer(s) removed. The embedding layer(s) 152B1A can therefore be trained based on training instances 155 with the goal of generating predicted interaction values, to enable generation of rich embeddings over the embedding layer(s) 152B1A. However, instead of providing an embedding generated over the embedding layer(s) 152B1A to the downstream layer(s) trained by the global training system 160, the embedding is instead provided to a second portion 152B2 that can be trained based on observed interactions and lack of interactions at the client device 110. As described with respect to FIG. 3A, optionally only the second portion 152B2 is updated through training at the client device 110, while maintaining the first portion 152B1 fixed. This can enable parameters of the second portion 152B2 to be updated to efficiently tailor the model to the client device 110. This can further enable leveraging of rich embeddings generated over the first portion 152B1 based on tokens and/or other contents of the electronic communication, while tailoring the second portion 152B2 based on observed interactions and lack of interactions—and taking into account additional features that can be applied to the second portion 152B2 (without being applied to the first portion 152B1). Such additional features can optionally include contextual features that may be strong indicators of predicted interaction values for individual client devices and/or users, but that may not generalize well among groups of client devices and/or users. Such additional features can additionally or alternatively include features that are sensitive and not suitable for being utilized in training a global model. Accordingly, in the implementation of FIGS. 3A and 3B, such additional features are utilized to tailor the second portion 152B2 at the client device 110 based on observations at the client device 110. Again, this can enable adaptation of the predicted interaction model to the client device 110 while leveraging rich embeddings generated over the first portion 152B1.

Turning again to FIG. 3A, the input features engine 122 determines input features based on the electronic communication 180, and based on sensor data and/or other data 181. The input features determined by the input features engine 122 include tokens 182A of the electronic communication 180 and include additional feature(s) 182B. The additional features 182B can be additional features of the electronic communication 180 and/or additional features based on sensor data (from sensors of the client device 110) and/or other data 181.

The tokens 182A are processed, by the predicted interaction value(s) engine 124 utilizing the local interaction prediction model first portion 152B1, to generate the embedding 183. The embedding 183 and the additional feature(s) 182B are processed, by the predicted interaction value(s) engine 124 utilizing the local interaction model second portion 152B2, to generate predicted interaction value(s) 184B.

The predicted interaction value(s) 184B are provided to the output engine 126, and optionally to the content selection engine 124. The output engine 126 utilizes the predicted interaction value(s) 184B to determine whether to cause one or more selectable interface elements 186B to be rendered. If the output engine 126 provides selectable interface element(s) 186B, it monitors for a selection of any one of the selectable interface element(s) 186B. If a selection is detected, the output engine 126 provides an indication of the selection 187B to the interaction engine 128.

The interaction engine 128, in response to receiving the indication of the selection 187B, provides one or more of the portion(s) of content 185B of the electronic communication 180 to at least one of the other application(s) 114 that corresponds to the selected selectable interface element.

The portion(s) of the content 185B can be determined by the content selection engine 124 based on processing of the tokens 182A and/or other features of the electronic communication, using the local content model 154A. In some implementations, the content selection engine 124 determines the portion(s) of content 185B in response to determining that one or more of the predicted interaction value(s) 184B satisfies a threshold.

The interaction monitoring engine 142 interfaces with the interaction engine 128, the other application(s) 114, and/or the UI input device(s) 117 to determine whether an interaction with at least one of the other application(s) 114 occurs on the basis of the electronic communication 180. The interaction monitoring engine 142 provides interaction indication 188B to the error engine 144. The interaction indication 188B indicates whether an interaction occurred on the basis of the electronic communication 180. The error engine 144 generates an error or other gradient 189B based on comparing the interaction indication 188A to the predicted interaction value(s) 184A. The update engine 146 updates the local interaction prediction model second portion 152B2 based on the gradient 189B—without updating the local interaction prediction model first portion 152B1. For example, the update engine 146 can backpropagate the gradient 189B over only the local interaction prediction model second portion 152B2.

Referring now to FIG. 4, a flow chart illustrating an example method of determining whether to provide a prompt for an interaction on the basis of an electronic communication, based on a generated predicted interaction value for the electronic communication, according to various implementations disclosed herein, is provided. Other implementations may perform the steps in a different order, omit certain steps, and/or perform different and/or additional steps than those disclosed in FIG. 4. The steps of the method illustrated in FIG. 4 may be performed by one or more components illustrated in FIG. 1, such as the client device 110.

At step 452, the system identifies an electronic communication. The electronic communication can be one being formulated at the system, or being received and/or viewed (or listened to) at the system.

At step 454, the system determines input features based on the electronic communication, and optionally based on additional data.

At step 456, the system processes the input features using a trained machine learning model to generate one or more predicted interaction values. Each predicted interaction value indicates a corresponding likelihood of interaction with a corresponding application, accessible to the system, on the basis of the electronic communication.

At step 458, the system determines whether any of the one or more predicted interaction values satisfies a threshold. If the system determines that none of the prediction interaction values satisfies a threshold, then the system proceeds to step 460 and does not provide any prompt for interaction (i.e., the system suppresses provision of any prompt for interaction, on the basis of the electronic communication).

If the system determines at step 458 that one of the predicted interaction value(s) satisfies a threshold, then the system proceeds to step 462 and provides a prompt for an interaction corresponding to the predicted interaction value. For example, the system can provide a selectable graphical element that, when selected, causes interaction with a corresponding application on the basis of the electronic communication.

At step 464, the system determines whether an affirmative user interface (UI) input is received in response to the prompt provided at step 462. If no affirmative UI input is received, then the system will not proceed to block 466. However, if the system determines affirmative UI input is received at step 464, then the system proceeds to step 466, and interfaces with an application corresponding to the interaction to provide provision content to the application.

The provision content is determined based on content of the electronic communication. For example, at step 468 the system can determine the provision content based on processing of content of the electronic communication utilizing an additional trained machine learning model. The provision content can be a rephrasing of (e.g., summary and/or extraction of) natural language content of the electronic communication. In some implementations, step 468 is performed in response to determining at step 458 that one of the predicted interaction value(s) satisfies a threshold—or in response to determining that affirmative UI input is received at step 464. In some implementations, step 468 may instead include determining provision content without utilization of an additional machine learning model. For example, in some of those implementations step 468 may include selecting all natural language content as provision content—or selecting only a subset, but selecting the subset without utilization of any machine learning model.

Referring now to FIG. 5, a flow chart illustrating an example method of updating a local interaction prediction model, according to various implementations disclosed herein, is provided. Other implementations may perform the steps in a different order, omit certain steps, and/or perform different and/or additional steps than those disclosed in FIG. 5. The steps of the method illustrated in FIG. 5 may be performed by one or more components illustrated in FIG. 1, such as the client device 110.

At step 552, the system identifies an electronic communication. The electronic communication can be one being formulated at the system, or being received and/or viewed (or listened to) at the system.

At step 554, the system determines whether an interaction with an application occurs on the basis on the identified electronic communication. In determining, at step 554, whether an interaction with an application occurs on the basis on the identified electronic communication, the system may perform one or more of sub-steps 5541, 5542, and 5543.

At sub-step 5541, the system determines whether an affirmative UI input is received in response to a prompt (e.g., a selection of a selectable interface element). For example, the system can provide a prompt for the electronic communication based on the method of FIG. 4 (e.g., block 462 of FIG. 4), and can determine whether an affirmative UI input is received in response to the prompt (e.g., block 464 of FIG. 4).

At sub-step 5542, the system determines whether content is copied from the identified electronic communication and pasted in the application.

At sub-step 5543, the system determines whether other UI input in the application occurred, where the other UI input corresponds to content of the identified electronic communication. For example, the other UI input can be typed and/or spoken input provided in the application.

In some implementations, at step 554 the system determines that interaction has occurred if the conditions of any of sub-steps 5541, 5542, or 5543 is satisfied. For example, the system can determine that interaction with the application has occurred if it determined at sub-step 5541 that affirmative UI input was received in response to a prompt, if it determined at sub-step 5542 that content was copied and pasted, or if it determined at sub-step 5543 that other UI input occurred.

At step 556, the system updates a local interaction prediction model based on whether the interaction with the application occurred, as determined at step 554. In updating the local interaction prediction model, step 556 may include performance of one or more of sub-steps 5561, 5562, and 5563.

At sub-step 5561, the system generates a predicted interaction value based on processing of features of the identified electronic communication using the local interaction prediction model.

At sub-step 5562, the system determines a gradient based on the predicted interaction value and based on whether the interaction with the application occurred, as determined at step 554.

At sub-step 5563, the system backpropagates the gradient over at least part of the local interaction prediction model.

At step 558, the system uses the updated local interaction prediction model to determine whether to present prompt(s) for additional electronic communication(s). For example, the system can use the updated local interaction prediction model in performance of an iteration of the method of FIG. 4.

At optional step 560, the system locally stores features of the identified electronic communication and the indication of whether the interaction with the application occurred. The system can locally store such data for use in future updating of a future local interaction prediction model. For example, if the system receives an updated global interaction prediction model at a later time (e.g., in response to further global training of a global model), the system can store it as a new local interaction prediction model, and utilize the stored data to quickly tailor the new local interaction prediction model. For example, the system can generate a new predicted interaction value using the new model, determine a new gradient based on the new predicted interaction value and whether the interaction with the application occurred, and backpropagate the gradient over at least part of the new model.

Referring now to FIG. 6, a flow chart illustrating an example method of updating a local content model, according to various implementations disclosed herein, is provided. Other implementations may perform the steps in a different order, omit certain steps, and/or perform different and/or additional steps than those disclosed in FIG. 6. The steps of the method illustrated in FIG. 6 may be performed by one or more components illustrated in FIG. 1, such as client device 110.

At step 652, the system identifies an electronic communication. The electronic communication can be one being formulated at the system, or being received and/or viewed (or listened to) at the system.

At step 654, the system determines content that has been provided to an application based on the identified electronic communication. In determining, at step 654, the content that has been provided to the application, the system may determine the content based on one of sub-steps 6541, 6542, and 6543.

At sub-step 6541, the system determines a user edit of automatically determined content, such as a user edit of content automatically determined based on block 468 of FIG. 4. The system can then determine the content based on the user edited version of the automatically determined content.

At sub-step 6542, the system determines the content based on the content having been copied from the identified electronic communication and pasted into an application.

At sub-step 6543, the system determines the content based on other UI input in an application that has occurred, based on the other UI input corresponding to content of the identified electronic communication.

At step 656, the system updates a local content model based on the content determined at block 654. In updating the local interaction content model, step 656 may include performance of one or more of sub-steps 6561, 6562, and 6563.

At sub-step 6561, the system generates predicted content based on processing of features of the identified electronic communication using the local content model.

At sub-step 6562, the system determines a gradient based on the predicted content and based on the determined content from step 654.

At sub-step 6563, the system backpropagates the gradient over at least part of the local content model.

At step 658, the system uses the updated local content model to determine provision content for additional electronic communication(s). For example, the system can use the updated local content model in performance of step 468 of FIG. 4, in a future iteration of the method of FIG. 4.

In some implementations, the system also optionally locally stores features of the identified electronic communication and the determined content from step for future updating of a future local content model. In some implementations, the system also optionally transmits the gradient, determined at sub-step 6562, for use in updating a global content model.

As used herein, an "electronic communication" or "communication" may refer to an email, a text message (e.g., SMS, MMS), an instant message, a chat message, a transcribed voicemail, or any other electronic communication that can be transmitted from a client device of a corresponding user to address(es) or other identifier(s) of a restricted group of one or more additional users. In various implementations, an electronic communication may include various metadata and the metadata may optionally be utilized in one or more techniques described herein. For example, an electronic communication such as an email may include an electronic communication address such as one or more sender identifiers (e.g., sender email addresses), one or more recipient identifiers (e.g., recipient email addresses, including cc'd and bcc'd recipients), a date sent, one or more attachments, a subject, a type of device that sent and/or received the electronic communication, and so forth. An electronic communication may also include a "body" that includes text and/or other content (e.g., image(s), emoji(s)), that is in addition to the metadata, and that may additionally or alternatively be utilized in one or more techniques described herein.

Turning now to FIGS. 7A, 7B, 8A, 8B, 9, and 10, example graphical user interfaces are illustrated for providing selectable graphical elements that, when selected, cause interaction with a corresponding application to provide at least part of a corresponding electronic communication to the corresponding application. The graphical user interfaces can each be presented, for example, through a display of a corresponding client device (e.g., client device 110 of FIG. 1), and presented in response to rendering of the graphical user interface by the corresponding client device.

In FIG. 7A, an email that has been sent to a user is being viewed by the user via an email application. A reply interface element is presented that enables the user to reply to the email via the email application. Also presented is a selectable graphical element 791A that, when selected, causes "Send slide deck to Tom in advance of presentation" to be provided to a separate "note-keeping" application. The content "Send slide deck to Tom in advance of presentation" can be determined based on content of the email, and the selectable graphical element 791A can be provided based on a corresponding generated predicted interaction value satisfying a threshold.

FIG. 7B illustrates the same email as FIG. 7A. However, in FIG. 7B the content "Send your slide deck to me in advance so I can review" has been automatically provided to the separate note-keeping application, without first prompting the user (e.g., as in FIG. 7A). In FIG. 7B, the selectable interface element 791B indicates that content from the email was automatically provided to the separate note-keeping application and, when selected, enables a user to modify the automatically added content within the note-keeping application (e.g., to change the wording and/or to remove the automatically added content from the note-keeping application).

Figure 8A:
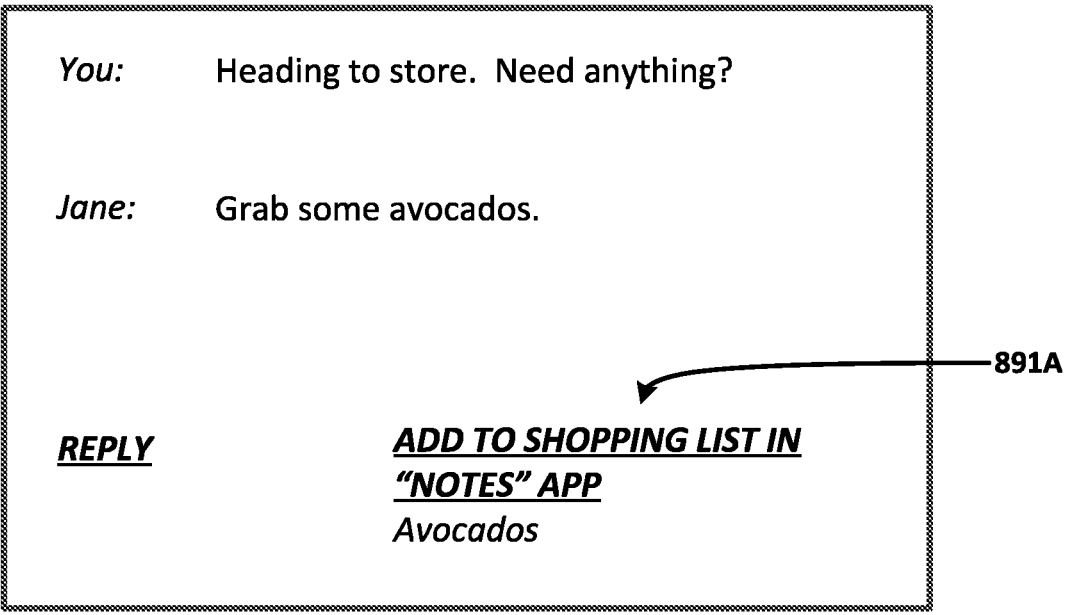

In FIG. 8A, a reply chat message that has been sent to a first user from "Jane" is being viewed by the first user via a chat message application. A reply interface element is presented that enables the user to reply via the chat message application. Also presented is a selectable graphical element 891A that, when selected, causes "Avocados" to be provided to a separate "note-keeping" application. The content "Avocados" can be determined based on content of the email, and the selectable graphical element 891A can be provided based on a corresponding generated predicted interaction value satisfying a threshold.

Figure 8B:
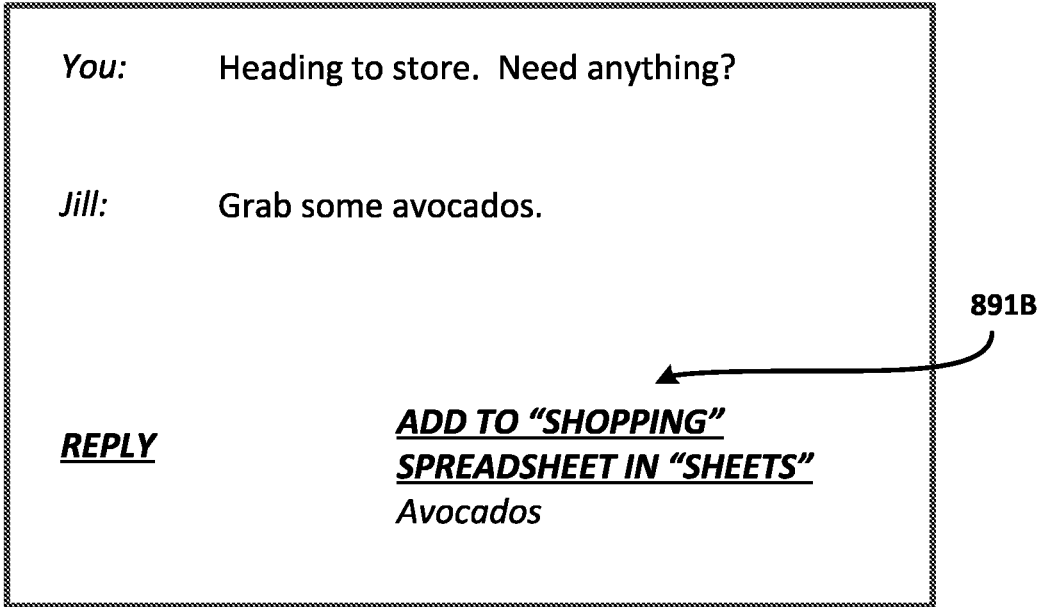

In FIG. 8B, a reply chat message that has been sent to a second user from "Jill" is being viewed by the second user via a chat message application. Although the reply chat message is the same as that in FIG. 8A, and the message to which it is responsive is the same, in FIG. 8B a selectable graphical element 891B is presented that, when selected, causes "Avocados" to be provided to a separate "sheets" application for incorporation in a spreadsheet (e.g., a Web-based "sheets" application). The different interaction recommendations may be provided to the different users in FIGS. 8A and 8B based on each of the recommendations being generated based on corresponding local interaction prediction models that are each individually tailored. For example, for the user of FIG. 8B a predicted interaction value corresponding to the "sheets" application may satisfy a threshold, whereas a separate predicted interaction value corresponding to the "note-keeping" application does not. On the other hand, for the user of FIG. 8A, a predicted interaction value corresponding to the "note-keeping" application may satisfy a threshold, whereas a separate predicted interaction value corresponding to the "sheets" application does not.

Figure 9:
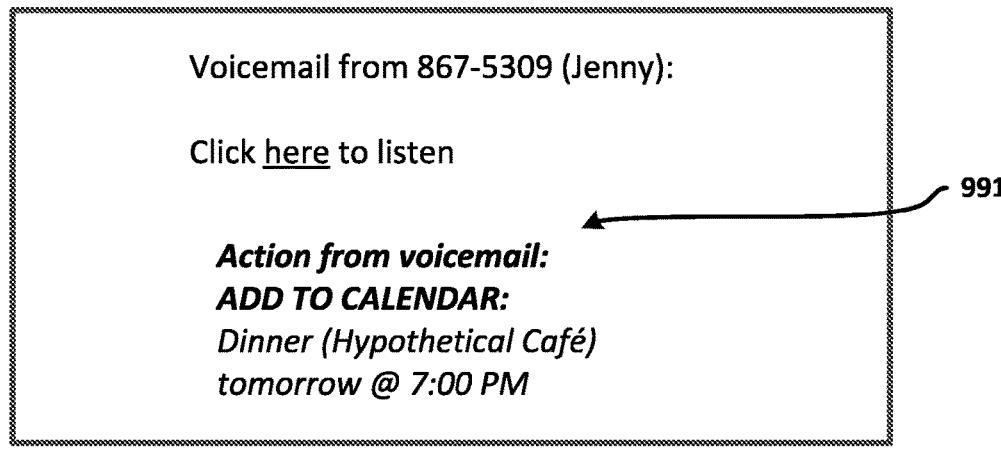

In FIG. 9, an interface is presented that enables a user to listen to a received voicemail. Presented in the interface is a selectable graphical element 991 that can be presented based on analysis of a transcription of the received voicemail, according to techniques described herein. For example, the voicemail from Jenny may have included "Hi, this is Jenny, just confirming you'll be able to join us for dinner tomorrow at 7:00". The selectable graphical element 991, when selected, causes a corresponding calendar entry to be created in a separate calendar application, or the calendar application to be surfaced with the corresponding calendar entry suggested (along with an interface element to confirm the calendar entry).

Figure 10:
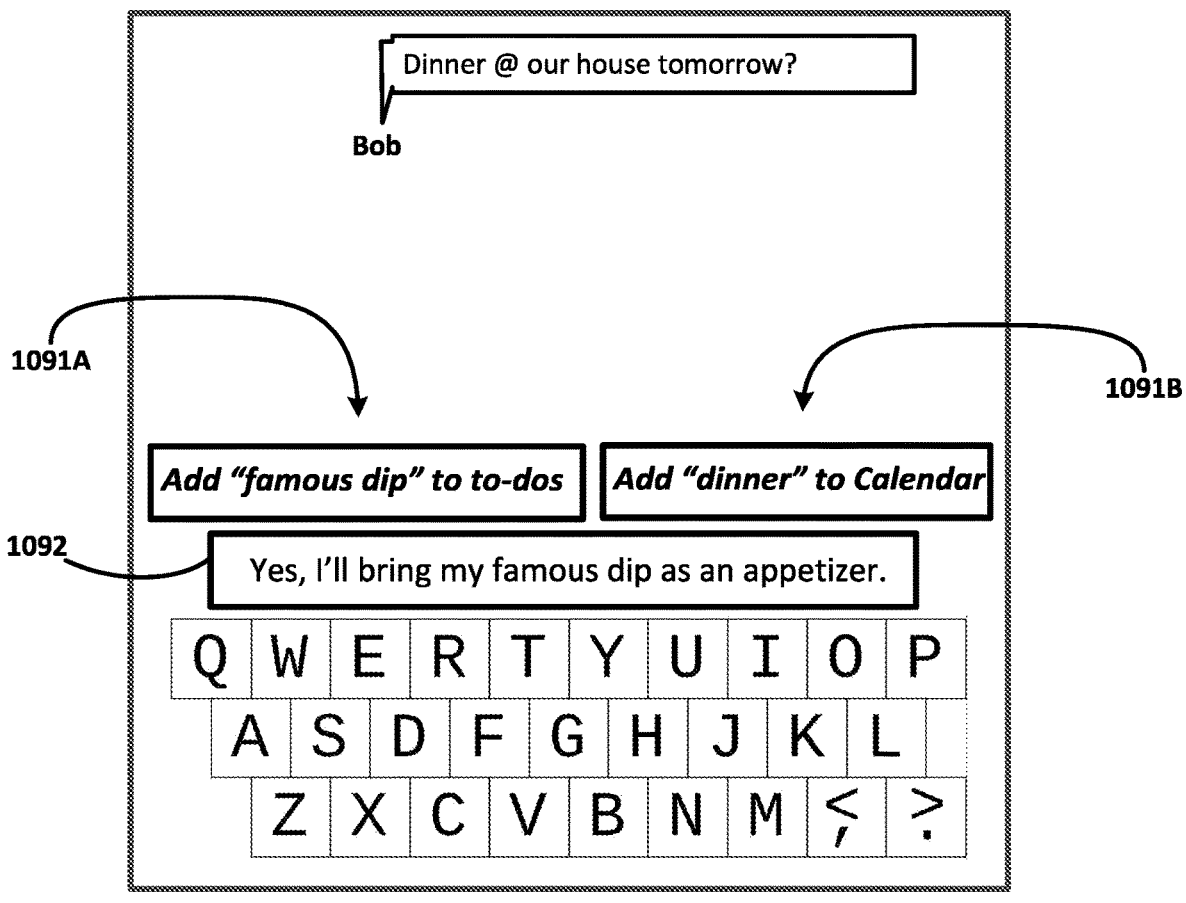

In FIG. 10, a user is formulating an electronic message that is a reply to a received chat message from "Bob". In FIG. 10, the user has utilized an electronic keyboard to provide content 1092 of "Yes, I'll bring my famous dip as an appetizer" as content of the electronic message being formulated. Selectable graphical elements 1091A and 1091B are presented based on the content 1092. Selectable graphical element 1091A, when selected, causes "famous dip" to be provided to a separate application for inclusion in a "to-do" list. Selectable graphical element 1091B, when selected causes "dinner" to be provided to yet another separate application (a calendar application) for creation of a calendar entry.

Although particular examples of selectable graphical elements are provided, additional and/or alternative prompts may be provided according to implementations disclosed herein. For example, a prompt can be audible in addition to, or as an alternative to, being graphical. Also, for example, a prompt can optionally be provided non-simultaneous with a display of a corresponding electronic message for which it is being provided.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 11:
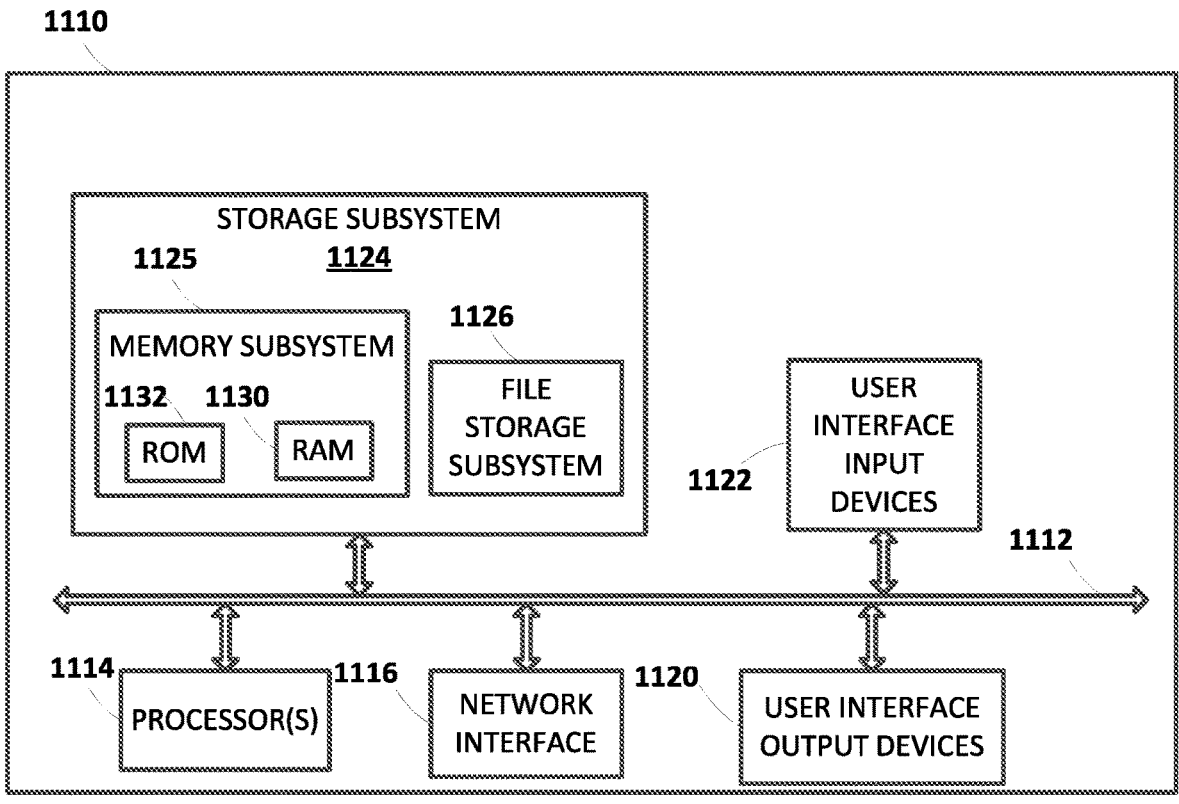
FIG. 11 illustrates an example architecture of a computing device.

FIG. 11 is a block diagram of an example computing device 1110. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of one or more of the methods described herein.

These software modules are generally executed by processor 1117 alone or in combination with other processors. Memory 1125 used in the storage subsystem can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1127, or in other machines accessible by the processor(s) 1117.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

What is claimed is:

1. A method, comprising:

receiving, at a client device, an electronic communication, the electronic communication being associated with an electronic communication application and including natural language content;

identifying, at the client device, one or more message features of the electronic communication, including a message feature associated with at least the natural language content;

causing, by the client device, processing of the message features using one or more machine learning models to generate one or more prediction interaction values indicating a corresponding likelihood of the client device interacting with, based on the message features of the electronic communication, a particular application feature of a particular application, of one or more applications including one or more application features, wherein the one or more applications are disparate from the electronic communication application;

determining whether one or more of the prediction interaction values satisfy one or more thresholds; and when a first predicted interaction value of the one or more prediction interaction values satisfies a first threshold and a second threshold:

initiating, by the client device, interaction between the client device and the particular application feature of the particular application;

when the first predicted interaction value of the one or more prediction interaction values satisfies the first threshold but fails to satisfy the second threshold:

causing a selectable element to be rendered at the client device, wherein the selectable element, when selected, initiates, by the client device, interaction between the client device and the particular application feature of the particular application; and when the first predicted interaction value of the one or more prediction interaction values fails to satisfy the first threshold and the second threshold:

refraining from causing the selectable element to be rendered and from initiating, by the client device, interaction between the client device and the particular application feature of the particular application.

2. The method of claim 1, wherein the interaction between the client device and the particular application feature is caused without identifying an input of a user of the client device subsequent to determining transmission of the electronic communication.

3. The method of claim 1, wherein the interaction between the client device and the particular application feature is caused in response to identifying an input of a user of the client device subsequent to determining transmission of the electronic communication.

4. The method of claim 1, further comprising:

determining, by the client device, that one or more different actions associated with a different particular application feature or a different particular application occurred subsequent to receiving the electronic communication; and causing, by the client device, training of the one or more machine learning models based on the one or more different actions occurring subsequent to receiving the electronic communication.

5. The method of claim 1, wherein the one or more message features further include a message feature determined based on application data associated with the electronic communication application.

6. The method of claim 1, wherein the one or more message features further include a message feature determined based on a sender of the electronic communication.

7. The method of claim 1, wherein the one or more message features further include a message feature determined based on sensor data of the client device.

8. The method of claim 7, wherein the message feature determined based on sensor data of the client device includes a status of a user, of the client device, determined based on the sensor data.

9. The method of claim 1, wherein the interaction between the client device and the particular application feature of the particular application is based on the natural language content.

10. The method of claim 1, wherein causing processing of the message features using the one or more machine learning models to generate the prediction interaction values is based on sensor data of the client device.

11. A system, comprising:

one or more processors; and one or more storage devices storing instructions that are operable, when executed by the one or more processors, to cause the one or more processors to perform operations comprising:

receiving, at a client device, an electronic communication, the electronic communication being associated with an electronic communication application and including natural language content;

identifying, at the client device, one or more message features of the electronic communication, including a message feature associated with at least the natural language content;

causing, by the client device, processing of the message features using one or more machine learning models to generate one or more prediction interaction values indicating a corresponding likelihood of the client device interacting with, based on the message features of the electronic communication, a particular application feature of a particular application, of one or more applications including one or more application features, wherein the one or more applications are disparate from the electronic communication application;

determining whether one or more of the prediction interaction values satisfy one or more thresholds; and when a first predicted interaction value of the one or more prediction interaction values satisfies a first threshold and a second threshold:
   initiating, by the client device, interaction between the client device and the particular application feature of the particular application;

when the first predicted interaction value of the one or more prediction interaction values satisfies the first threshold but fails to satisfy the second threshold:
   causing a selectable element to be rendered at the client device, wherein the selectable element, when selected, initiates, by the client device, interaction between the client device and the particular application feature of the particular application; and when the first predicted interaction value of the one or more prediction interaction values fails to satisfy the first threshold and the second threshold:
   refraining from causing the selectable element to be rendered and from initiating, by the client device, interaction between the client device and the particular application feature of the particular application.

12. The system of claim 11, wherein the interaction between the client device and the particular application feature is caused without identifying an input of a user of the client device subsequent to determining transmission of the electronic communication.

13. The system of claim 11, wherein the interaction between the client device and the particular application feature is caused in response to identifying an input of a user of the client device subsequent to determining transmission of the electronic communication.

14. The system of claim 11, the operations further comprising:
   determining, by the client device, that one or more different actions associated with a different particular application feature or a different particular application occurred subsequent to receiving the electronic communication; and
   causing, by the client device, training of the one or more machine learning models based on the one or more different actions occurring subsequent to receiving the electronic communication.

15. The system of claim 11, wherein the one or more message features further include a message feature determined based on application data associated with the electronic communication application.

16. The system of claim 11, wherein the one or more message features further include a message feature determined based on a sender of the electronic communication.

17. The system of claim 11, wherein the one or more message features further include a message feature determined based on sensor data of the client device.

18. The system of claim 17, wherein the message feature determined based on sensor data of the client device includes a status of a user, of the client device, determined based on the sensor data.

19. The system of claim 11, wherein the interaction between the client device and the particular application feature of the particular application is based on the natural language content.

20. The system of claim 11, wherein causing processing of the message features using the one or more machine learning models to generate the prediction interaction values is based on sensor data of the client device.

* * * * *